United States Patent
Struzyna et al.

(10) Patent No.: US 10,042,370 B2
(45) Date of Patent: Aug. 7, 2018

(54) REPLACEMENT OF FLUID IN FRESHWATER NETWORKS

(71) Applicant: Trimble Inc., Sunnyvale, CA (US)

(72) Inventors: Markus Struzyna, Sankt Augustin (DE); Georg Hewelt, Bucholz (DE)

(73) Assignee: Trimble Inc., Sunnyvale, CA (US)

( * ) Notice: Subject to any disclaimer, the term of this patent is extended or adjusted under 35 U.S.C. 154(b) by 94 days.

(21) Appl. No.: 15/345,154

(22) Filed: Nov. 7, 2016

(65) Prior Publication Data

US 2018/0129229 A1    May 10, 2018

(51) Int. Cl.
| | |
|---|---|
| *G05D 7/06* | (2006.01) |
| *E03C 1/05* | (2006.01) |
| *E03C 1/00* | (2006.01) |
| *G05B 15/02* | (2006.01) |
| *G05D 9/12* | (2006.01) |
| *F04B 49/06* | (2006.01) |
| *F16K 37/00* | (2006.01) |
| *E03C 1/01* | (2006.01) |

(52) U.S. Cl.
CPC .......... *G05D 7/0676* (2013.01); *G05B 15/02* (2013.01); *G05D 9/12* (2013.01); *E03C 1/00* (2013.01); *E03C 1/01* (2013.01); *F04B 49/065* (2013.01); *F16K 37/005* (2013.01)

(58) Field of Classification Search
CPC ........ G05D 7/0676; G05D 9/12; G05B 15/02; F04B 49/065; F16K 37/005
See application file for complete search history.

(56) References Cited

U.S. PATENT DOCUMENTS

| | | | | | |
|---|---|---|---|---|---|
| 4,361,522 | A | * | 11/1982 | Goettl | F24F 6/04 137/132 |
| 4,471,498 | A | * | 9/1984 | Robertshaw | E03D 5/10 4/302 |
| 4,529,516 | A | * | 7/1985 | Nolan | B03C 1/032 210/222 |
| 4,914,758 | A | * | 4/1990 | Shaw | E03B 1/00 137/118.04 |
| 5,482,062 | A | * | 1/1996 | Chen | B08B 3/04 134/104.2 |
| 5,961,831 | A | * | 10/1999 | Lee | A01K 63/042 119/204 |
| 8,162,236 | B2 | * | 4/2012 | Rodenbeck | E03C 1/057 239/390 |
| 9,777,470 | B2 | * | 10/2017 | Mazz | E03C 1/055 |
| 2005/0071914 | A1 | * | 4/2005 | Marshall | E03D 3/00 4/427 |

(Continued)

*Primary Examiner* — Ramesh Patel

(74) *Attorney, Agent, or Firm* — Kilpatrick Townsend & Stockton

(57) ABSTRACT

A fluid network exchange system for efficiently exchanging fluid in a fluid network for prevention of hygiene risks. The system includes a source and a plurality of sinks. The system also includes flow meters for determining the flow rate at each of the sinks and automatic flushing devices for flushing fluid at each of the sinks. The system determines an order and a flushing time for the plurality of sinks to be flushed. The sinks are flushed starting with the sink with the highest flow rate and ending with the sink with the lowest flow rate. Flushing times are determined based on the length of different pathways corresponding to different sinks.

20 Claims, 18 Drawing Sheets

(56) References Cited

U.S. PATENT DOCUMENTS

2006/0005312 A1\* 1/2006 Reddy .................... A47K 13/24
                                                    4/668
2015/0322652 A1\* 11/2015 Mazz ...................... E03C 1/055
                                                    137/560

\* cited by examiner

| Sink/Path | Flow Rate $[10^{-4} \text{ m}^3/\text{s}]$ | Volume of Path $[10^{-3} \text{ m}^3]$ | Flushing Time [s] | Flushing Order |
|---|---|---|---|---|
| 1 | 1.3 | 29 | 223.1 | 1 |
| 2 | 1.2 | 2 | 16.7 | 2 |
| 3 | 0.9 | 10 | 111.1 | 3 |
| 4 | 0.8 | 15 | 187.5 | 4 |
| 5 | 0.8 | 6 | 75.0 | 5 |
| 6 | 0.7 | 2 | 28.6 | 6 |

500

REPLACEMENT OF FLUID IN FRESHWATER NETWORKS

BACKGROUND

Network flushing problems appear in many areas in industrial, commercial, and residential settings. Often these networks include freshwater for drinking fountains, sinks, and showers. The efficient maintenance of freshwater networks present important economical and health challenges. Specifically, freshwater networks that go unused for a period of time may facilitate the growth of mold or bacteria populations. There exists a need for new techniques for flushing networks that use less fluid, take less time, and more efficiently replace the existing fluid.

SUMMARY

In a first embodiment of the present disclosure, a fluid network exchange system is provided. The fluid network exchange system may include a fluid network. The fluid network may include a plurality of fluid paths. The fluid paths may include a first path and a second path. The fluid network exchange system may include a source being an entry point of fluid to the fluid network. The fluid network exchange system may include a plurality of sinks being exit points of fluid from the fluid network. The plurality of sinks may include a first sink having a first flow rate and a second sink having a second flow rate. The first flow rate may be greater than or equal to the second flow rate. The second flow rate may be greater than or equal to the flow rate of each of the plurality of sinks other than the first sink. The fluid network exchange system may include a plurality of automatic flushing devices positioned at the plurality of sinks. The plurality of automatic flushing devices may include a first automatic flushing device positioned at the first sink and a second automatic flushing device positioned at the second sink. The fluid network exchange system may include one or more processors in data communication with the plurality of automatic flushing devices and with one or more computer readable storage mediums. The one or more computer readable storage mediums may include instructions that cause the one or more processors to perform operations. The operations may include determining a first flushing time for exchanging the fluid in the first path using the first automatic flushing device. The first path may include a first portion of the fluid network extending between the first sink and the source. The operations may include determining a second flushing time for exchanging the fluid in the second path using the second automatic flushing device. The second path may include a second portion of the fluid network extending between the second sink and the first path. The operations may include causing the first automatic flushing device to flush for the first flushing time. The operations may include causing the second automatic flushing device to flush for the second flushing time.

In some embodiments, the fluid network may further include a third path. In some embodiments, the plurality of sinks may further include a third sink having a third flow rate. The third flow rate may be greater than or equal to the flow rate of each of the plurality of sinks other than the first sink and the second sink. In some embodiments, the plurality of automatic flushing devices may further include a third automatic flushing device positioned at the third sink. In some embodiments, the operations may further include determining a third flushing time for exchanging the fluid in the third path using the third automatic flushing device. The third path may include a third portion of the fluid network between the third sink and at least one of the first path and the second path. The operations may include causing the third automatic flushing device to flush for the third flushing time. In some embodiments, the fluid network may further include a fourth path. In some embodiments, the plurality of sinks may further include a fourth sink having a fourth flow rate. The fourth flow rate may be greater than or equal to the flow rate of each of the plurality of sinks other than the first sink, the second sink, and the third sink. In some embodiments, the plurality of automatic flushing devices may further include a fourth automatic flushing device positioned at the fourth sink. In some embodiments, the operations may further include determining a fourth flushing time for exchanging the fluid in the fourth path using the fourth automatic flushing device. The fourth path may include a fourth portion of the fluid network between the fourth sink and at least one of the first path, the second path, and the third path. In some embodiments, the operations may further include causing the fourth automatic flushing device to flush for the fourth flushing time. In some embodiments, the plurality of automatic flushing devices may be flushed sequentially, the second automatic flushing device after the first automatic flushing device, the third automatic flushing device after the second automatic flushing device, and the fourth automatic flushing device after the third automatic flushing device. In some embodiments, the second automatic flushing device may be flushed immediately after the first automatic flushing device is flushed for the first flushing time. In some embodiments, the third automatic flushing device may be flushed immediately after the second automatic flushing device is flushed for the second flushing time. In some embodiments, the fourth automatic flushing device may be flushed immediately after the third automatic flushing device is flushed for the third flushing time. In some embodiments, the plurality of automatic flushing devices may be electromagnetic valves. In some embodiments, the flow rate for each of the plurality of sinks may be a volume flow rate expressed in a unit of volume per a unit of time. In some embodiments, determining the first flushing time for exchanging the fluid in the first path may include determining a volume of the first path and determining the first flushing time based on the volume of the first path and the first flow rate. In some embodiments, determining the second flushing time for exchanging the fluid in the second path may include determining a volume of the second path and determining the second flushing time based on the volume of the second path and the second flow rate.

In a second embodiment of the present disclosure, a fluid network exchange system is provided. The fluid network exchange system may include a source being an entry point of fluid to a fluid network. The fluid network exchange system may include a plurality of sinks being exit points of fluid from the fluid network. The fluid network exchange system may include one or more processors in data communication with one or more computer readable storage mediums. The one or more computer readable storage mediums may include instructions that cause the one or more processors to perform operations. The operations may include obtaining a flow rate associated with each of the plurality of sinks. The operations may include identifying a first sink of the plurality of sinks having a first flow rate. The operations may include identifying a second sink of the plurality of sinks having a second flow rate. The first flow rate may be greater than or equal to the second flow rate. The second flow rate may be greater than or equal to the flow rate of each of the plurality of sinks other than the first sink. The operations may include determining a first flushing time for exchanging the fluid in a first path using the first sink. The first path may include a first portion of the fluid network extending between the first sink and the source. The operations may include determining a second flushing time for exchanging the fluid in a second path using the second sink. The second path may include a second portion of the fluid network extending between the second sink and the first path. The operations may include causing the first sink to flush for the first flushing time and thereafter causing the second sink to flush for the second flushing time.

In a third embodiment of the present disclosure, a method of replacing fluid in a fluid network is provided. The method may include identifying a source and a plurality of sinks in the fluid network. The source may be an entry point of fluid to the fluid network. The plurality of sinks may be exit points of the fluid from the fluid network. The method may include obtaining a flow rate associated with each of the plurality of sinks. The method may include identifying a first sink of the plurality of sinks having a first flow rate. The method may include identifying a second sink of the plurality of sinks having a second flow rate. The first flow rate may be greater than or equal to the second flow rate. The second flow rate may be greater than or equal to the flow rate of each of the plurality of sinks other than the first sink. The method may include determining a first flushing time for exchanging the fluid in a first path using the first sink. The first path may include a first portion of the fluid network extending between the first sink and the source. The method may include determining a second flushing time for exchanging the fluid in a second path using the second sink. The second path may include a second portion of the fluid network extending between the second sink and the first path. The method may include causing the first sink to flush for the first flushing time and thereafter causing the second sink to flush for the second flushing time.

In some embodiments, the method may include identifying a third sink of the plurality of sinks having a third flow rate. The third flow rate may be greater than or equal to the flow rate of each of the plurality of sinks other than the first sink and the second sink. The method may include determining a third flushing time for exchanging the fluid in a third path using the third sink. The third path may include a third portion of the fluid network between the third sink and at least one of the first path and the second path. The method may include causing the third sink to flush for the third flushing time. In some embodiments, the method may include identifying a fourth sink of the plurality of sinks having a fourth flow rate. The fourth flow rate may be greater than or equal to the flow rate of each of the plurality of sinks other than the first sink, the second sink, and the third sink. The method may include determining a fourth flushing time for flushing a fourth path using the fourth sink. The fourth path may include a fourth portion of the fluid network between the fourth sink and at least one of the first path, the second path, and the third path. The method may include causing the fourth sink to flush for the fourth flushing time. In some embodiments, the flow rate for each of the plurality of sinks may be a volume flow rate expressed in a unit of volume per a unit of time. In some embodiments, determining the first flushing time for exchanging the fluid in the first path may include determining a volume of the first path and determining the first flushing time based on the volume of the first path and the first flow rate. Determining the second flushing time for exchanging the fluid in the second path may include determining a volume of the second path and determining the second flushing time based on the volume of the second path and the second flow rate.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
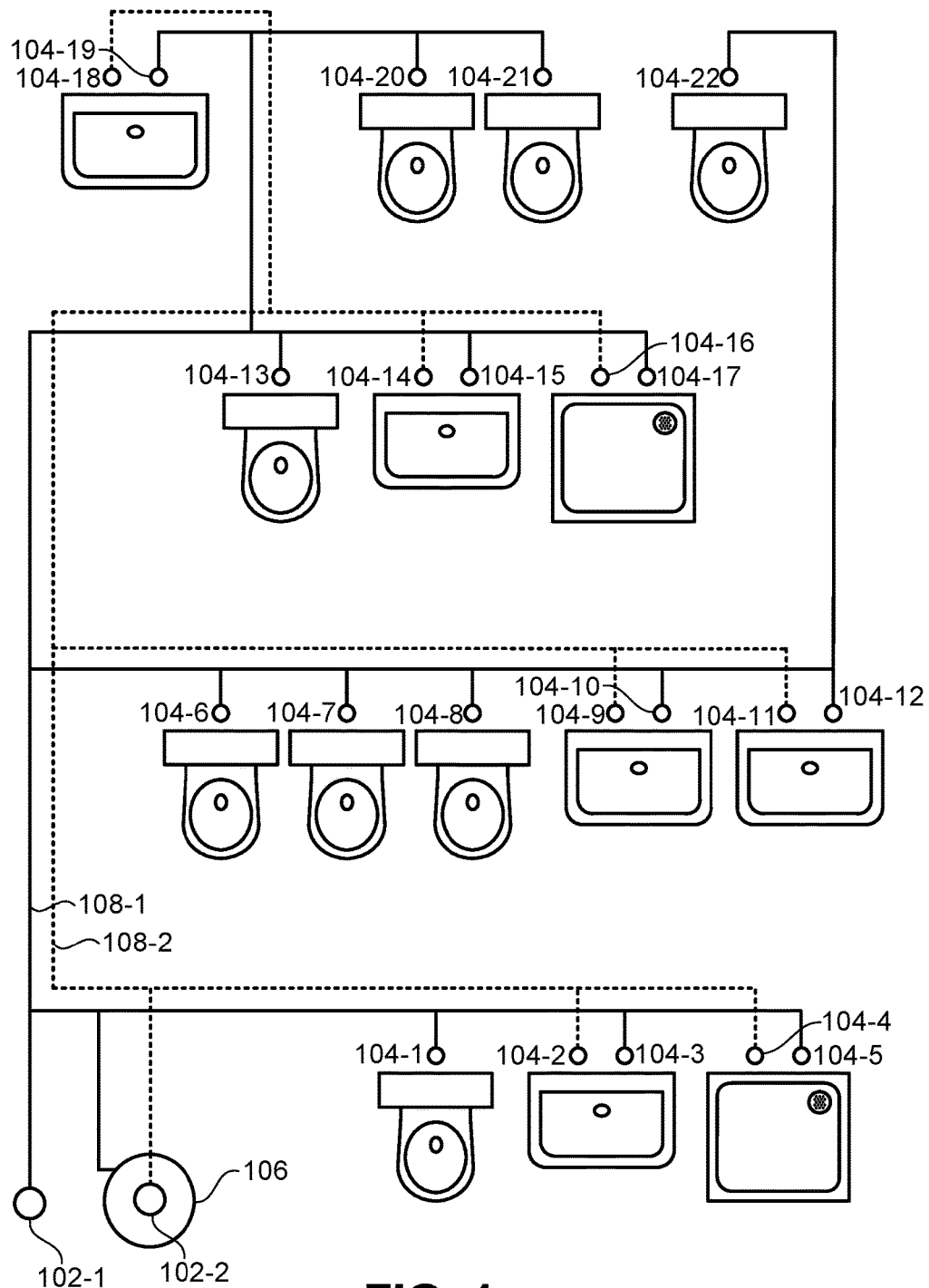
FIG. 1 illustrates a building freshwater network, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Freshwater networks generally include at least one source and at least one sink for providing usable water in industrial, agricultural, commercial, and residential applications. In a residential setting, freshwater must be potable water that is safe to drink. In other applications, such as in agricultural settings, freshwater need not be potable but generally must have a sufficiently low salinity. Freshwater networks are often arranged in tree-like configurations, where branches that diverge out from the main line do not connect back to the main line. Rings may exist where branches connect to other branches or connect back to the main line, creating multiple possible paths between a given source and a given sink.

Described herein are systems, methods, and techniques for efficiently exchanging fluid in a fluid network. Some of the primary aims of the present disclosure are directed toward the prevention of hygiene risks, such as bacteria buildup that often occur in pipes of freshwater networks, and the economic use of freshwater to flush such networks. For example, techniques of the present disclosure use less fluid to completely flush a fluid network than currently available methods. Furthermore, techniques of the present disclosure completely flush a fluid network in less time than currently available methods. Other benefits of the present disclosure may become apparent to one skilled in the art. Embodiments of the present disclosure allow determination of a flushing sequence for a plurality of sinks in a fluid network exchange system. The determined flushing sequence specifies an order for the plurality of sinks to be flushed, and a flushing time for each of the plurality of sinks to be flushed. The flushing sequence may be implemented with a computerized approach in which automatic flushing devices positioned at the plurality of sinks receive instructions from a processor, or may be implemented manually by physically flushing each of the flushing devices in the specified order and for the specified time.

Some embodiments of the present disclosure include a fluid network exchange system made up of various computerized sensors and flushing devices overlaid within a building's fluid network. A central control module housing a processor and memory may communicate with various flow meters positioned in the fluid network to determine the speed, flow rate, and/or volume flow rate of the various sinks. Flow meters may be positioned at sinks or may be positioned in or around channels within the fluid network, including at the source. Based on information received by the control module from the flow meters, the control module determines the flushing sequence which includes first determining the flushing order and second determining the flushing time for the various sinks. The control module then outputs information to automatic flushing devices causing them to perform the flushing sequence.

Definitions

As used herein, the term "freshwater network" may be used interchangeably with "network", "fluid network", "fluid exchange system", "fluid network exchange system", and may refer to the locations and/or devices in which a fluid is contained within a system of piping or other material for conveying fluid. A freshwater network may exist within a building, a home, a hospital, an airport, a school, or even in a city-wide, county-wide, or state-wide water supply system.

As used herein, the term "freshwater" may be used interchangeably with "fluid", "water", "liquid", "media", and may refer to any type of liquid or gas that is capable of being conveyed in a channel, such as water, oil, petroleum, fuel, gasoline, natural gas, helium, nitrogen, oxygen, detergent, paint, fertilizer, insecticide, pesticide, herbicide, and the like.

As used herein, the term "source" may refer to a location and/or device at which freshwater enters a network. A source may be a water main, a water heater, a water reserve, a well, a river, a body of water, a bladder in a vehicle, a container or tub of chemicals, a hydrant, and the like. Although sources are generally assumed to be in an open state, they may also be in a closed state or some other state.

As used herein, the term "sink" may be used interchangeably with the terms "consumer", "valve", "flushing device", "automatic flushing device", and may refer to a location and/or a device at which freshwater exits a network. A sink may be a conventional kitchen sink, a bathroom sink, a shower, a toilet, a faucet, a spigot, a sprinkler, and the like. Sinks may be in one of several states, including open, closed, and partially open.

Fluid Network Exchange System

FIG. 1 illustrates a building freshwater network, according to an embodiment of the present disclosure. The building freshwater network includes sources 102 and sinks 104 for allowing freshwater to enter or exit the freshwater network. Sources 102 include a cold water source 102-1 and a hot water source 102-2, which provide cold water and hot water to cold freshwater network 108-1 and hot freshwater network 108-2, respectively. Although hot water source 102-2 is linked to cold water source 102-1 through a water heater 106, the two sources may function independently and be treated as independent sources. In some embodiments, hot water source 102-2 may be treated as both a sink and a source, as it functions as an exit point of freshwater in the cold freshwater network 108-1 and as an entry point of freshwater in the hot freshwater network 108-2.

Sinks 104 may be distributed throughout various floors of a commercial building, different rooms of a home, or throughout some other type of residential or commercial facility. Sinks 104 often include toilets (104-1, 104-6, 104-7, etc.), conventional sinks (104-2, 104-3, 104-10, etc.), and showers (104-4, 104-5, 104-16, etc.), but are not limited to these items. Cold freshwater network 108-1 and hot freshwater network 108-2 comprise various channels connecting sinks 104 to each other and sinks 104 to sources 102. Some channels may contain fluid at a given instant in time and be empty at another instant in time. Similarly, some channels may contain fluid that is flowing/moving while simultaneously other channels may contain stagnant fluid.

Figure 2:
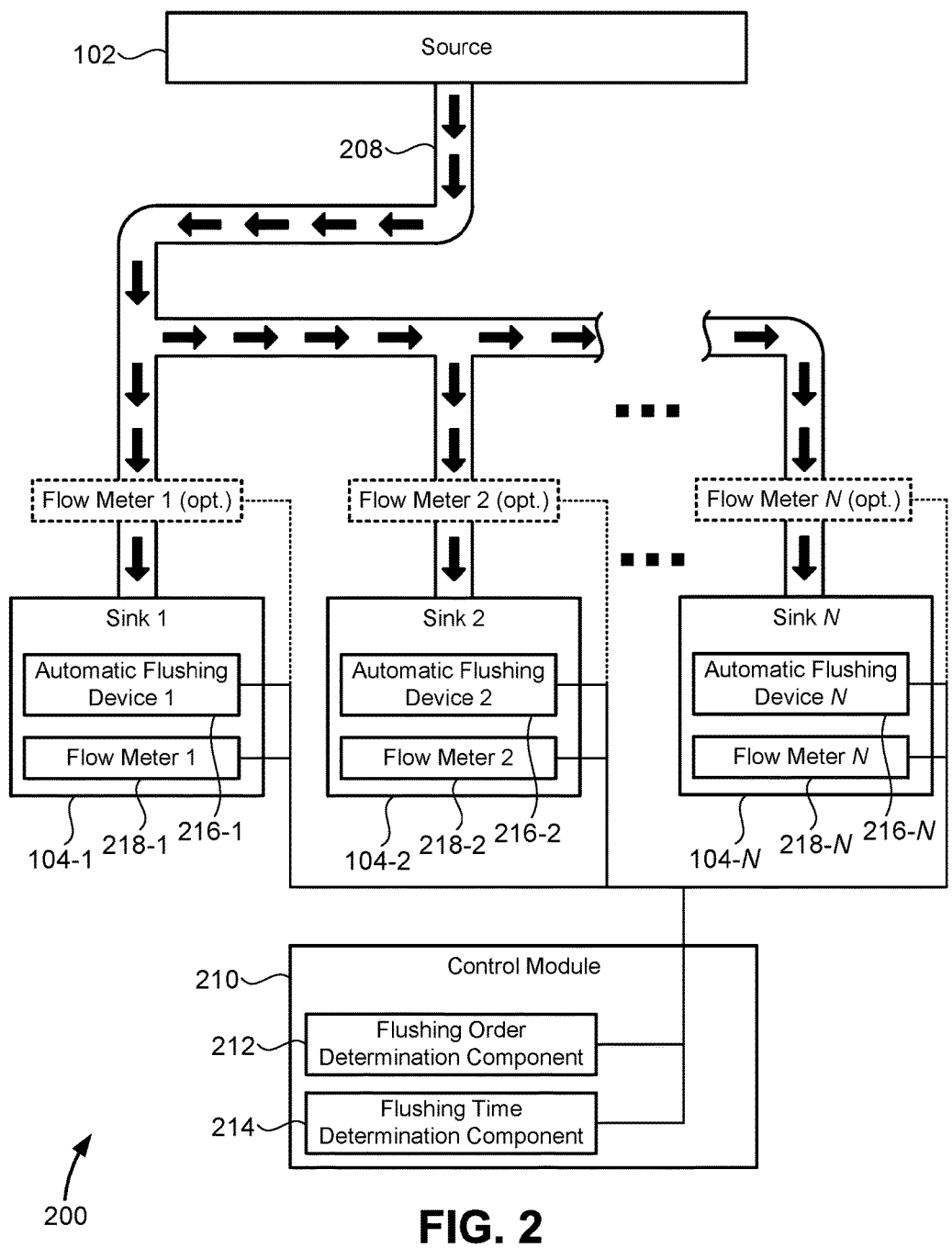
FIG. 2 illustrates a block diagram of a fluid network exchange system, according to an embodiment of the present disclosure.

FIG. 2 illustrates a block diagram of a fluid network exchange system 200, according to an embodiment of the present disclosure. Fluid network exchange system 200 includes a source 102, a plurality of sinks 104, automatic flushing devices 216, flow meters 218, a fluid network 208, and a control module 210. Automatic flushing devices 216 are devices capable of controlling the flow of fluid at the sinks 104, and may be characterized as being integrated with, positioned at, or separate from sinks 104. Automatic flushing devices 216 may be electromechanically operated valves such as solenoid valves, which convert electrical signals into mechanical movement, or they may be integrated with existing manual flushing devices, such as a flush handle on a toilet, a turnable sink handle, or a twistable shower knob. For example, an automatic flushing device may include a motor integrated with a turnable sink handle such that when activated the sink handle rotates in the same motion as if it were turned manually.

In some embodiments, flow meters 218 are positioned either at sinks 104 or within fluid network 208 to determine flow rates for the various sinks and channels and to report information to control module 210. Flow meters 218 may measure linear, nonlinear, or volumetric flow rate, and may comprise rotameters, turbine flow meters, paddlewheel sensors, calorimetric flowmeters, turbine flowmeters, electromagnetic flowmeters, ultrasonic doppler flowmeters, and the like. In some embodiments, flow meters 218 report measurements in a unit of volume per second. For example, a certain flow meter may report that the fluid near the sensor is moving at 0.01 $m^3/s$. In some embodiments, flow meters 218 report measurements in a unit of volume or mass. For example, a certain flow meter may report that 10 $m^3$ of fluid has passed the sensor over a period of time. In some embodiments, flow meters 218 report measurements in a unit of meters per second. For example, a certain flow meter may report that the fluid near the sensor is moving at 1 m/s. Measurements made by flow meters 218 may be converted to different units with knowledge of the sizes of the channels, e.g., diameter of the piping.

Control module 210 is coupled to automatic flushing devices 216 and flow meters 218 through a wired or a wireless connection, and includes two main components: flushing order determination component 212 and flushing time determination component 214. In some embodiments, control module 210 includes a processor, a memory, and other computer systems necessary to carry out the described functions, such as wireless communicators and antennas. In some embodiments, control module 210 is a software module operable on a computer and/or portable electronic device. Based on information received by control module 210 from flow meters 218, control module 210 determines the flushing sequence, which includes first determining the flushing order and second determining the flushing time for sinks 104. Control module 210 then outputs the information to automatic flushing devices 216 causing them to perform the flushing sequence. Determination of the flushing sequence is described in detail in reference to FIGS. 3A-3B.

In some embodiments, fluid network exchange system 200 does not include flow meters 218. Instead, flow rates of sinks 104 may be estimated and/or previously measured. Estimation of the flow rates may include determining a water pressure for a building and the sizes of the channels, and then estimating using known techniques and formulas in the art. Alternatively, flow rates may be estimated with less accuracy using industry standards. In some embodiments, flow rates may be manually measured using various techniques, such as filling a container for a period of time and measuring the volume. In some embodiments, fluid network exchange system 200 does not include automatic flushing devices 216. Instead, the flushing sequence is manually performed by one or more individuals who move throughout a building to the physical locations of sinks 104 and manually opening sinks 104 according to the determined flushing sequence.

Figure 3A:
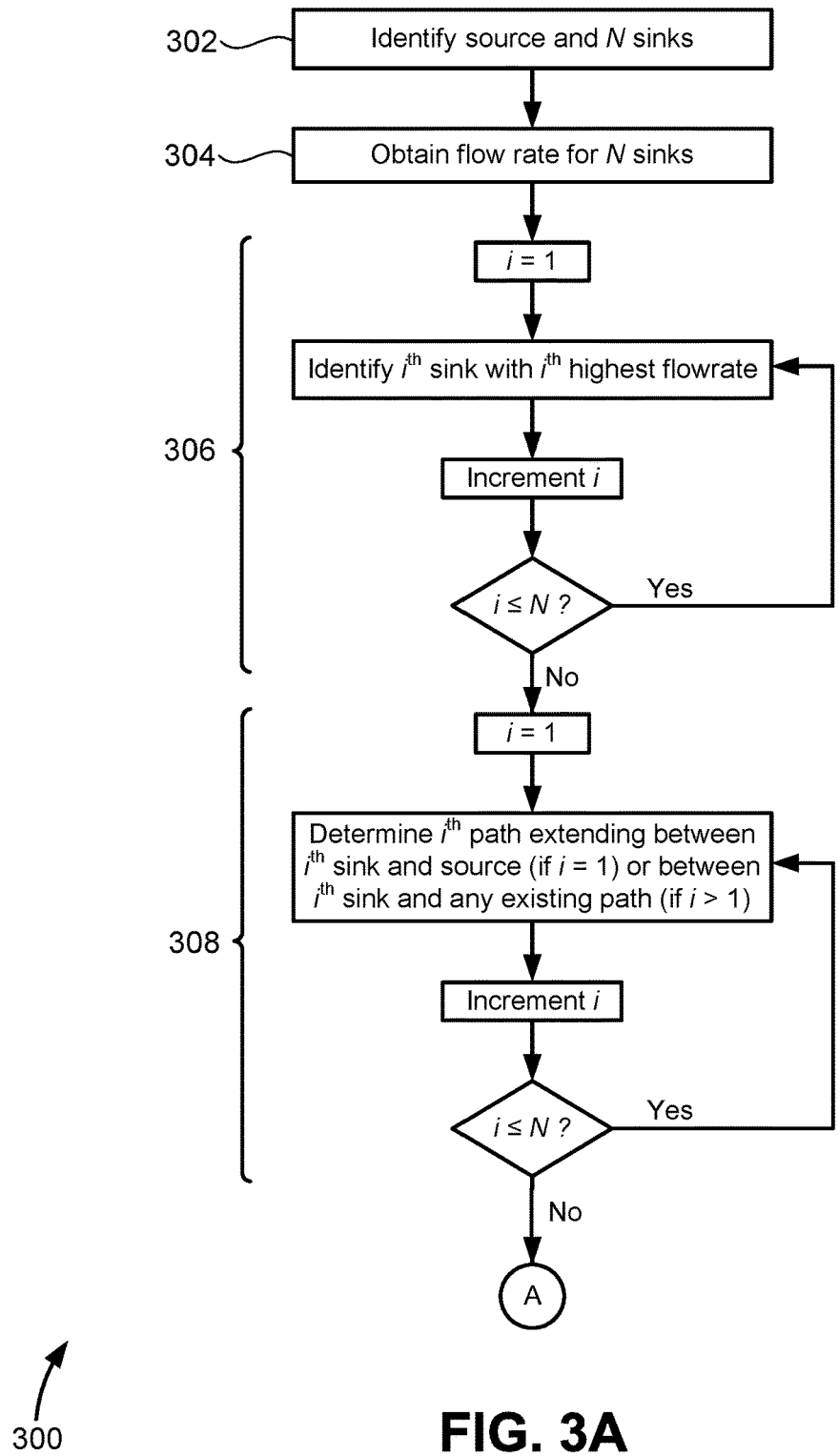
FIGS. 3A-3B illustrate a method for exchanging fluid in a fluid network, according to an embodiment of the present disclosure.
Figure 3B:
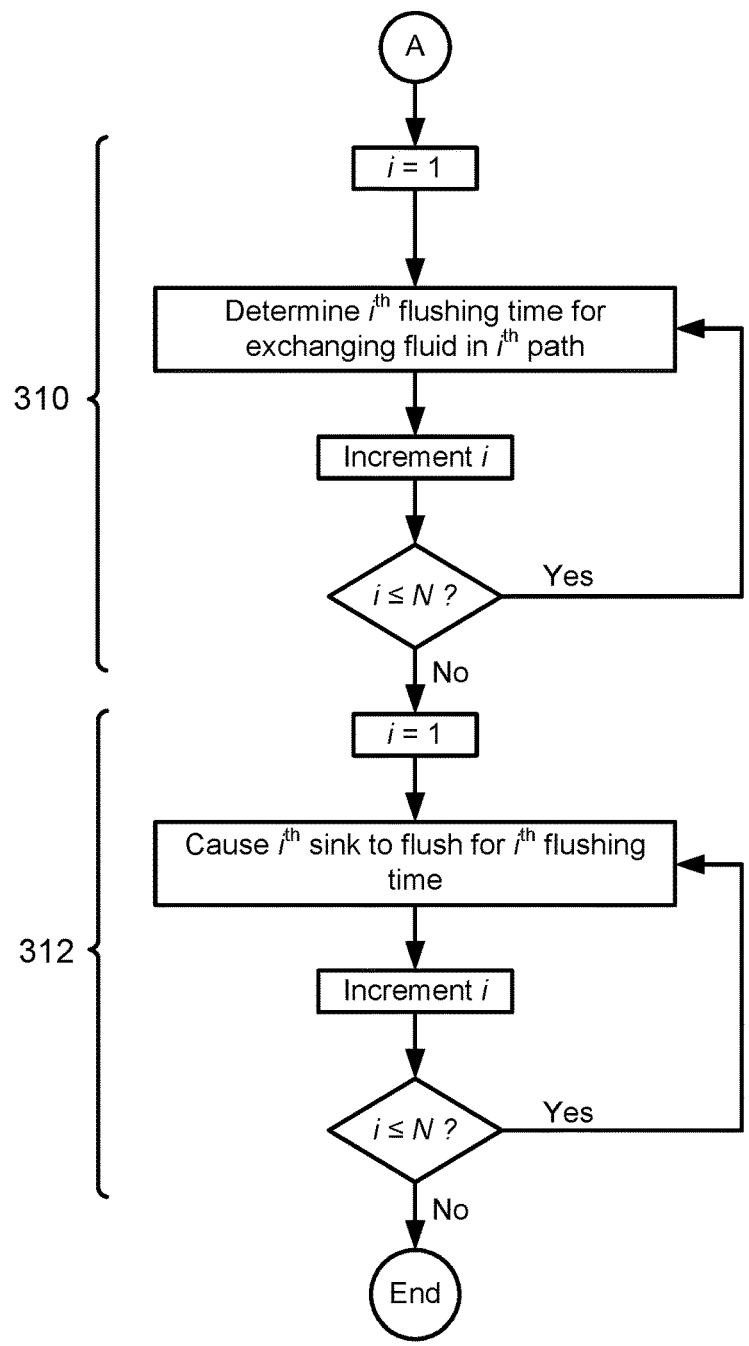

FIGS. 3A-3B illustrate a method 300 for exchanging fluid in a fluid network, according to an embodiment of the present disclosure. At step 302, a source and a plurality of sinks are identified. At step 304, a flow rate associated with each of the plurality of sinks is obtained. Each flow rate may be obtained through measurement and/or estimation using the methods described previously. At step 306, the sink with the highest flow rate is identified, then the sink with the second highest flow rate is identified, and continuing until all sinks are ordered in terms of flow rate. For convenience, the sink with the highest flow rate may be referred to as the first sink, and the sink with the second highest flow rate may be referred to as the second sink, and so forth. Where two sinks have identical flow rates, the order of the two sinks may be selected randomly, or may be selected in terms of physical proximity to the preceding sink. In some embodiments, step 306 may instead comprise a sorting algorithm that sorts the N sinks according to flow rate, which may increase the speed of step 306.

At step 308, a path in the fluid network corresponding to each sink is determined. For the first sink, the first path extends between the first sink and the source. For all remaining paths corresponding to other sinks, the $i^{th}$ path extends between the $i^{th}$ sink and one of the already existing paths. At step 310, the flushing time for exchanging fluid in each path is determined. In some embodiments, this step need not be performed in any certain order, e.g., first path to last path, as the determination of flushing times may not be cross dependent. At step 312, each sink is caused to flush for the determined flushing time. For example, the first sink is caused to flush for the first flushing time, thereafter the second sink is caused to flush for the second flushing time, and continuing until all sinks have been flushed.

In some embodiments, steps 302, 304, 306, 308, 310, and 312 are not performed sequentially as shown but rather are performed simultaneously during a single round of iterations from i=1 to i=N. For example, the sink with the highest flowrate (first sink) can be identified simultaneously with determining the first path extending between the first sink and the source. Furthermore, simultaneously with these operations, the first flushing time for exchanging fluid in the first path may be determined and the first sink may be caused to be flushed for the first flushing time. Combining steps 302, 304, 306, 308, 310, and 312 as described may significantly speed up performance of method 300.

Figure 4A:
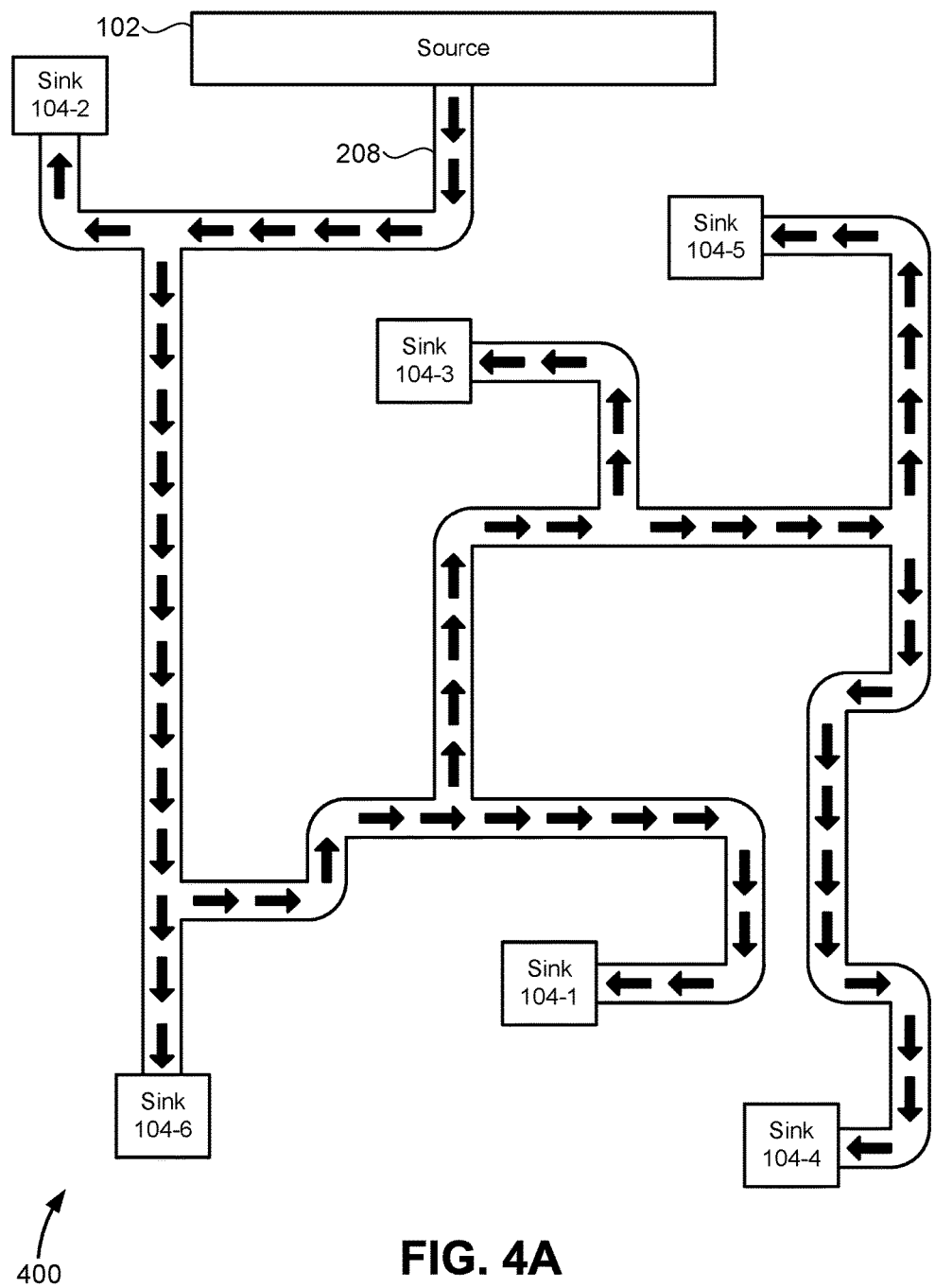
FIGS. 4A-4D illustrate a fluid network exchange system, according to an embodiment of the present disclosure.
Figure 4B:
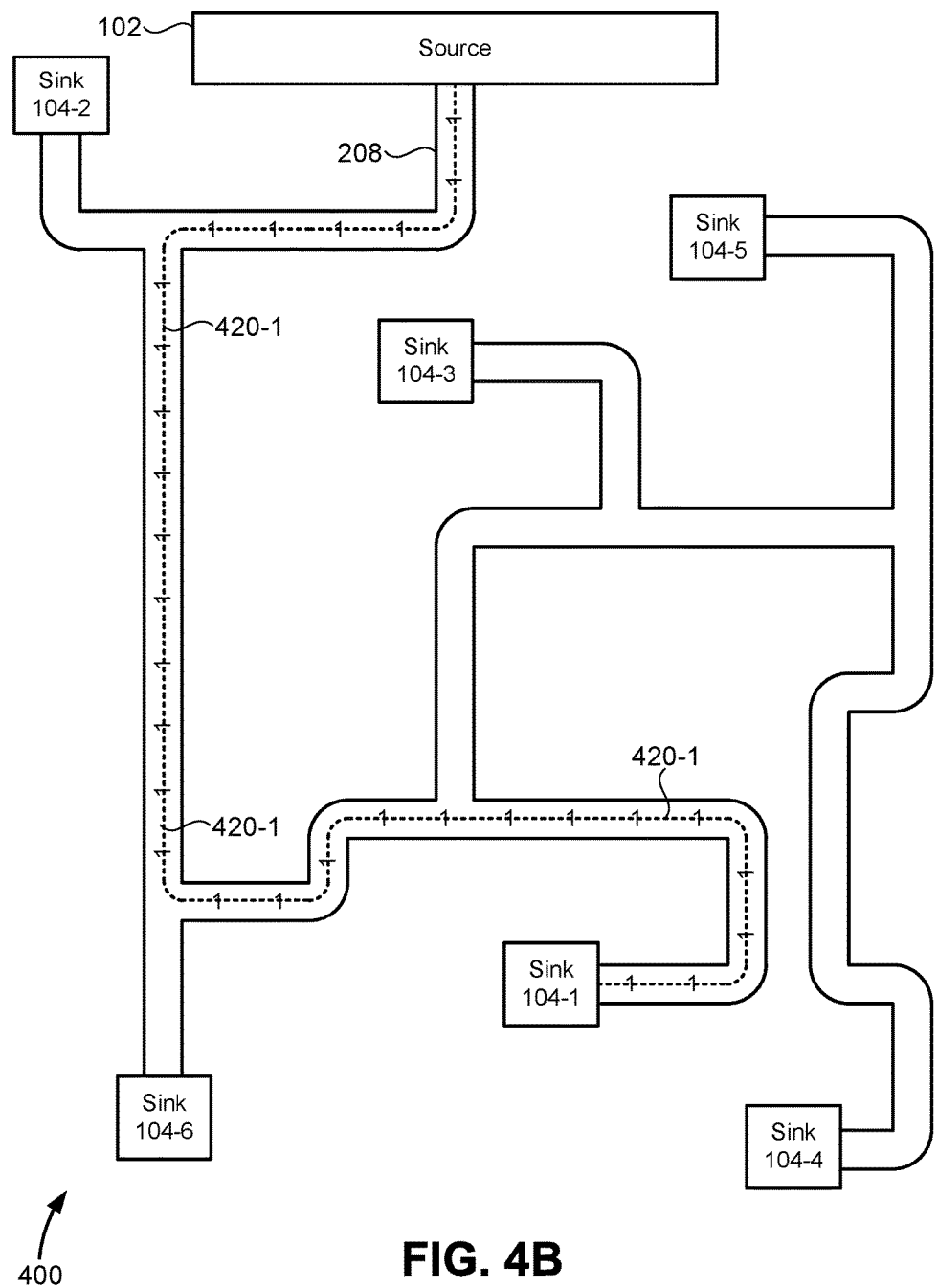
Figure 4C:
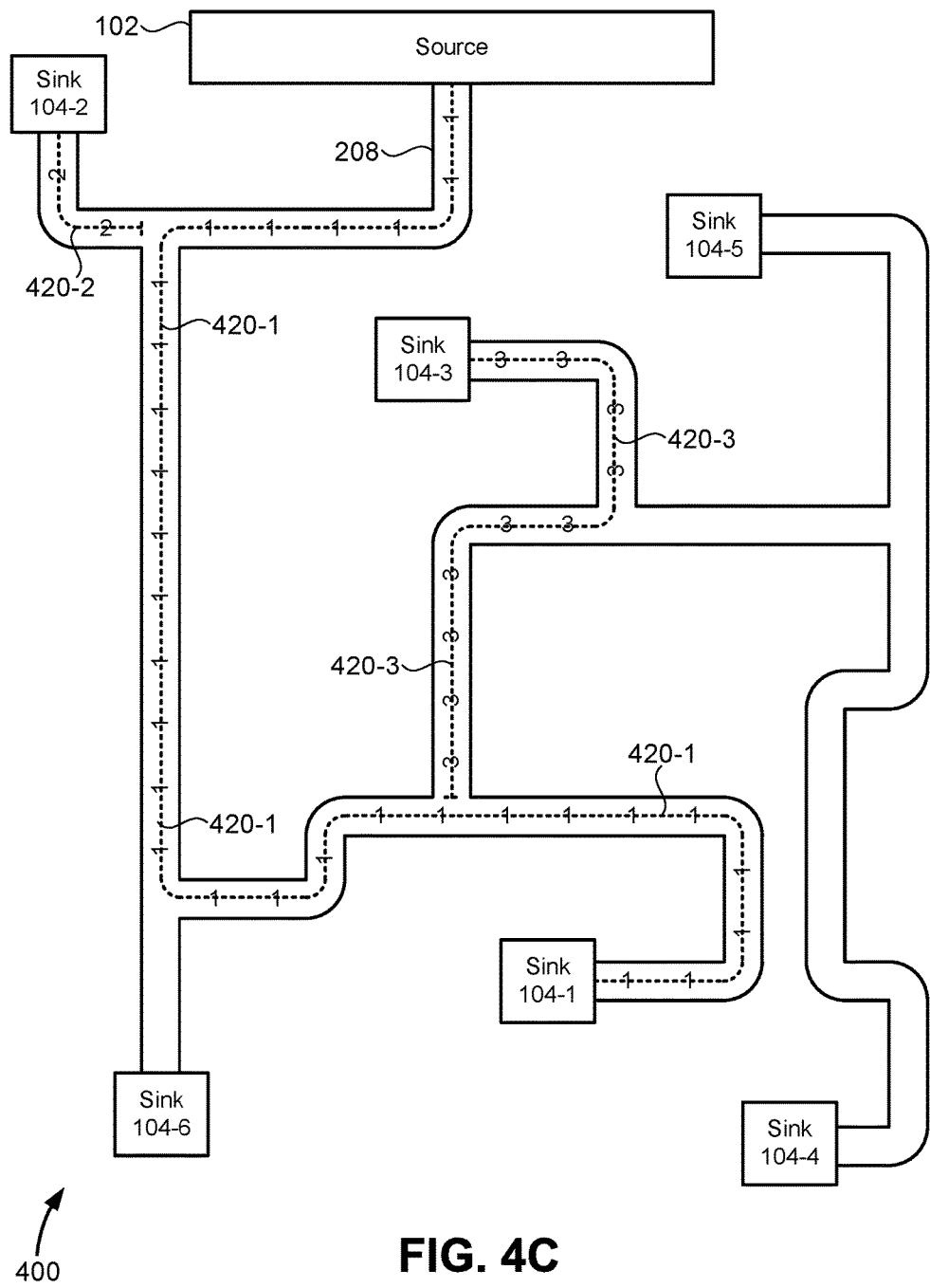
Figure 4D:
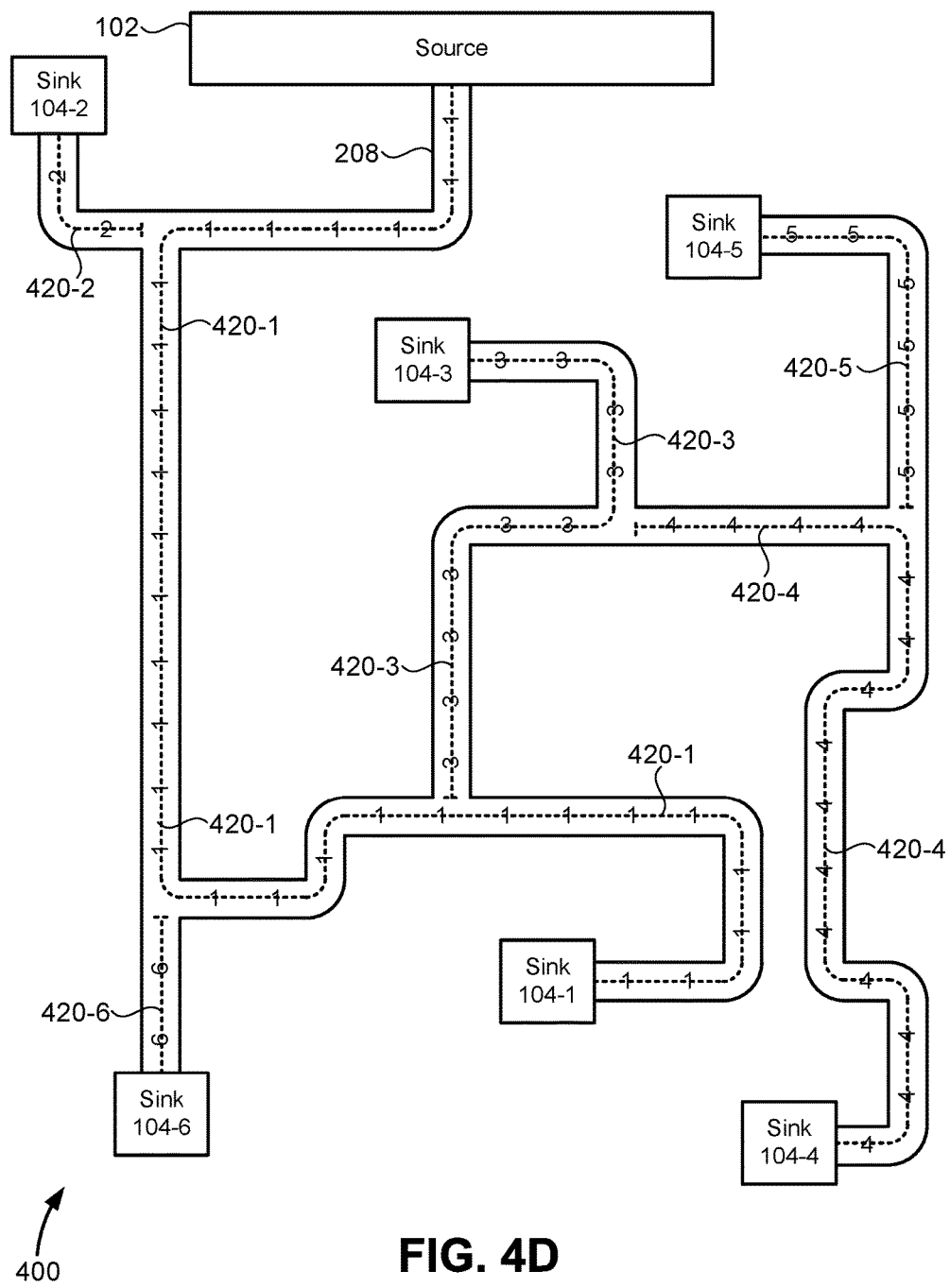
Figure 5:
FIG. 5 illustrates a table corresponding to a fluid network exchange system, according to an embodiment of the present disclosure.

FIGS. 4A-4D, 5, and 6A-6C demonstrate the performance of method 300 with a fluid network exchange system 400, according to an embodiment of the present disclosure. Fluid network exchange system 400 includes one source and six sinks arranged in a tree-like configuration, in which only one possible path exists between the source and each sink. In reference to FIG. 4A, arrows demonstrate the flow direction within fluid network 208. In accordance with step 304 of method 300, the flow rates associated with the sinks are obtained. These flow rates are shown in FIG. 5 and are expressed in $m^3/s$. In accordance with step 306 of method 300, the sink with the highest flowrate, sink 104-1, is identified. The sink with the next highest flowrate, sink 104-2, is also identified, continuing until all sinks have been identified and ordered in terms of flow rate.

Next, in accordance with step 308 of method 300, a path in the fluid network corresponding to each sink is determined. In reference to FIG. 4B, path 420-1 corresponding to sink 104-1 is the path extending between sink 104-1 and source 102. In some embodiments, paths are determined by starting a path at each sink, extending the path in the fluid channel toward the source, and stopping the path once reaching an already existing path, or stopping once reaching the source, whichever comes first. In reference to FIG. 4C, path 420-2 corresponding to sink 104-2 is determined to be the path extending between sink 104-2 and path 420-1, and path 420-3 corresponding to sink 104-3 is determined to be the path extending between sink 104-3 and path 420-1. In reference to FIG. 4D, path 420-4 corresponding to sink 104-4 is determined to be the path extending between sink 104-4 and path 420-3, path 420-5 corresponding to sink 104-5 is determined to be the path extending between sink 104-5 and path 420-4, and path 420-6 corresponding to sink 104-6 is determined to be the path extending between sink 104-6 and path 420-1.

Next, in accordance with step 310 of method 300, the flushing times for exchanging fluid in each path are determined. FIG. 5 illustrates a table with various quantities corresponding to fluid network exchange system 400, according to an embodiment of the present disclosure. In some embodiments, flushing times are determined by dividing the volumes of the paths by the corresponding flow rates. Volumes may be calculated or estimated using building schematics and blueprints. For example, the volume of a pipe can be calculated if the length and diameter of the pipe are known quantities.

Figure 6A:
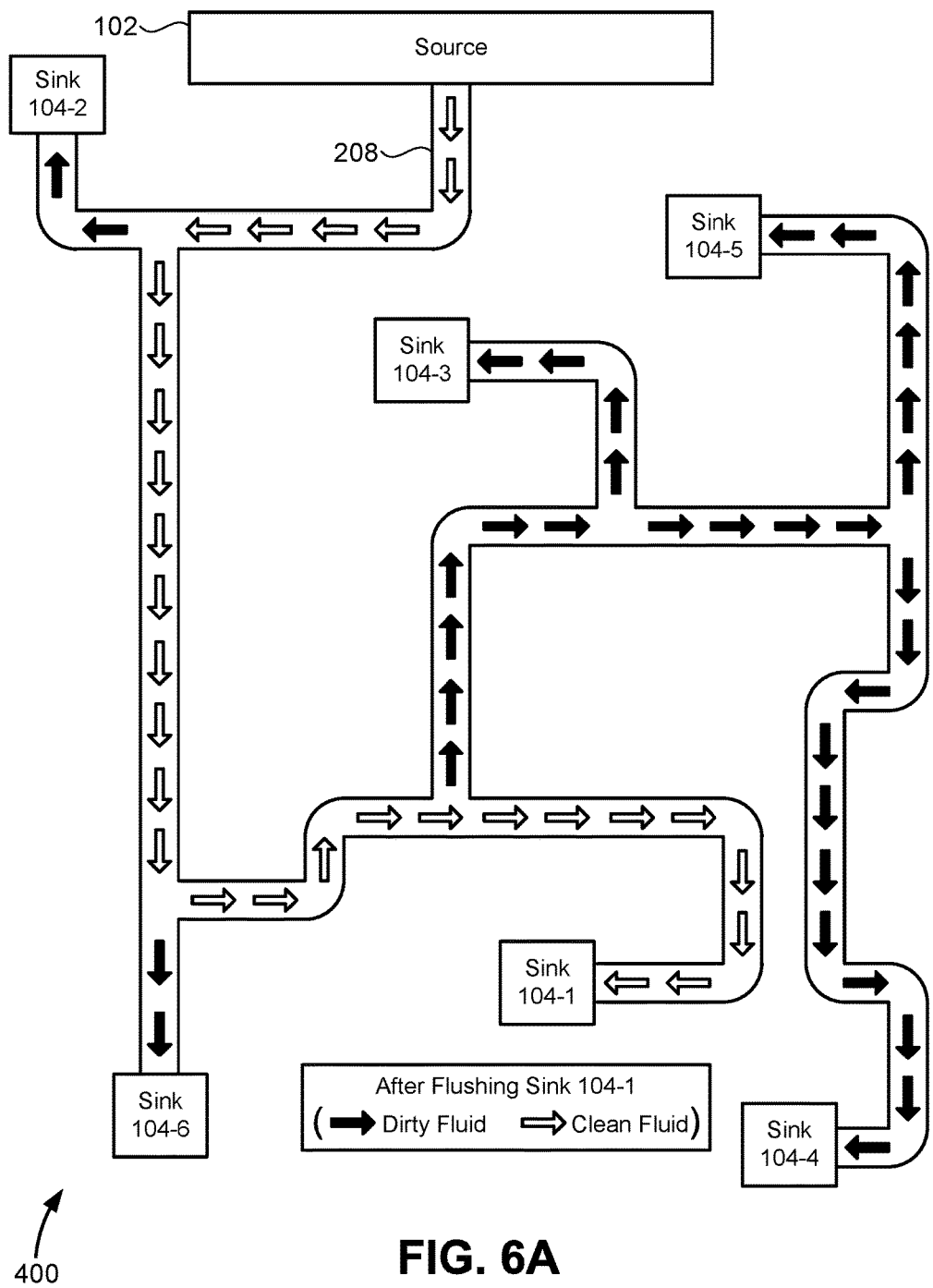
FIGS. 6A-6C illustrate various steps of a method for exchanging fluid in a fluid network, according to an embodiment of the present disclosure.
Figure 6B:
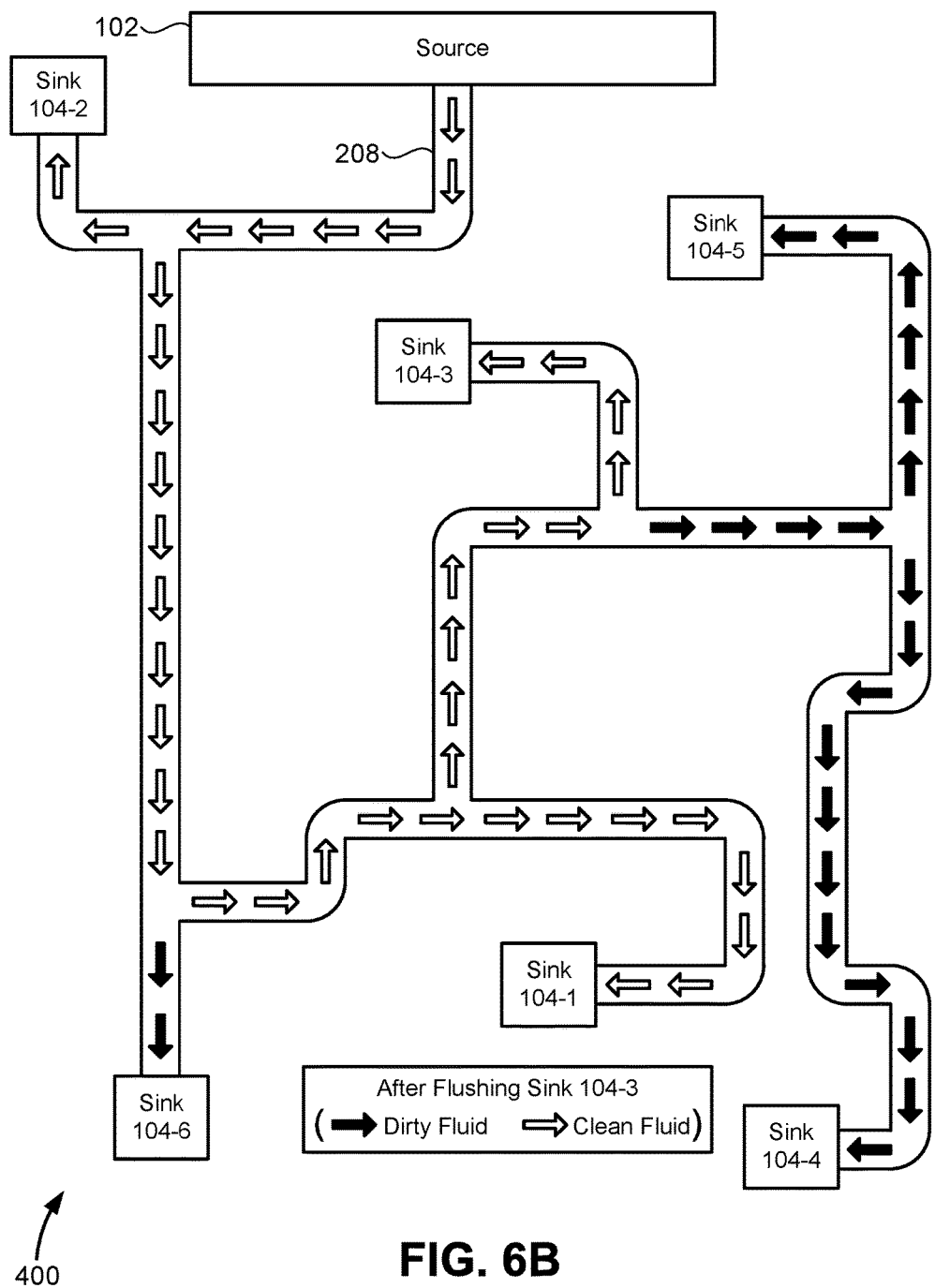
Figure 6C:
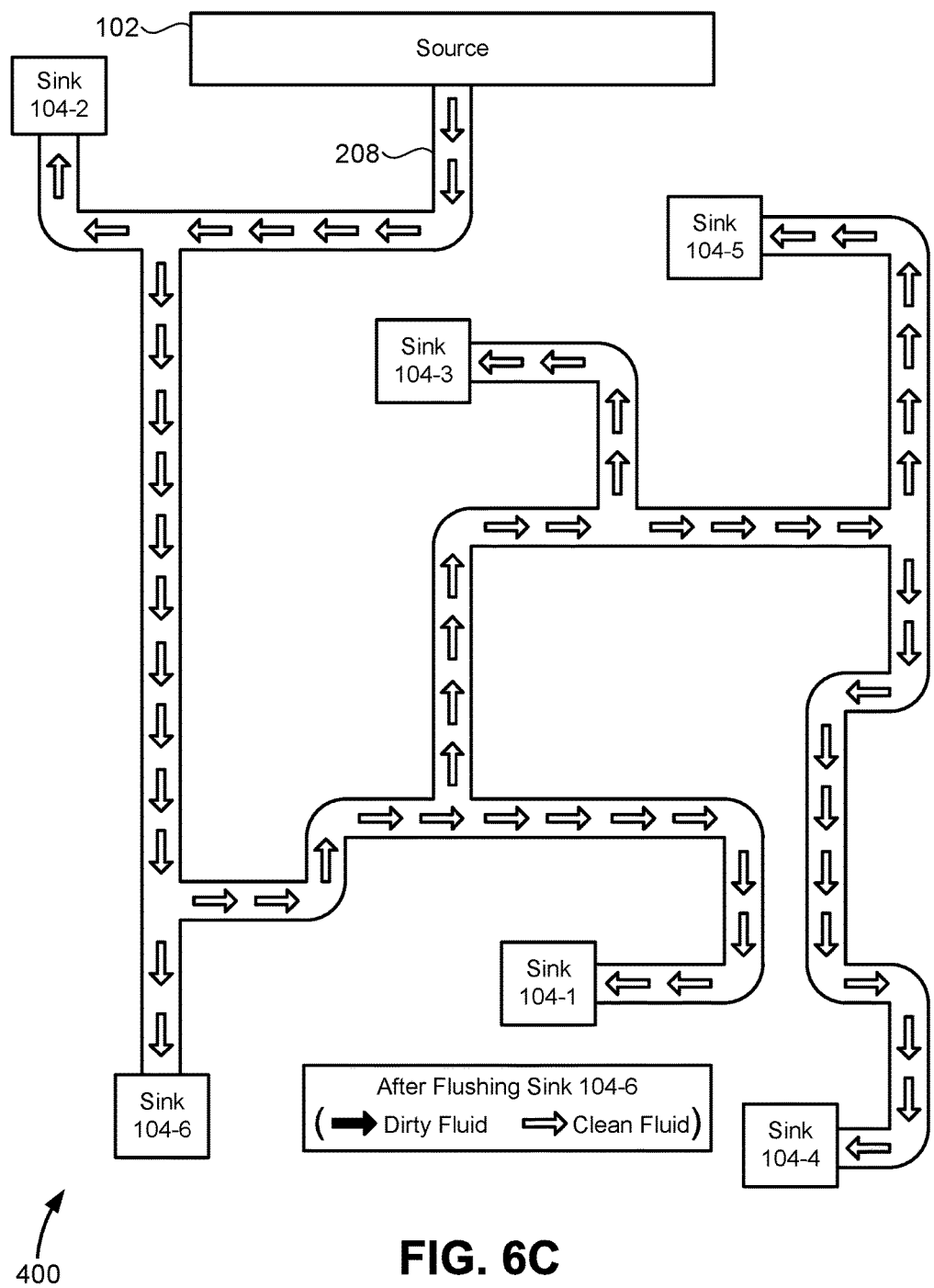

In accordance with step 312 of method 300, each sink is caused to flush for the determined flushing time in the determined order. FIGS. 6A-6C illustrate this process in a scenario in which fluid network 208 has become contaminated with dirty fluid, according to an embodiment of the present disclosure. In reference to FIG. 6A, sink 104-1 is caused to flush for 223.1 seconds which exchanges dirty fluid with clean fluid along path 420-1. In reference to FIG. 6B, sinks 104-2 and 104-3 are caused to flush for 16.7 and 111.1 seconds which exchanges dirty fluid with clean fluid along paths 420-2 and 420-3, respectively, and in the determined order. In reference to FIG. 6C, sinks 104-4, 104-5, and 104-6 are caused to flush for 187.5, 75.0, and 28.6 seconds which exchanges dirty fluid with clean fluid along paths 420-4, 420-5, and 420-6, respectively, and in the determined order.

Figure 7:
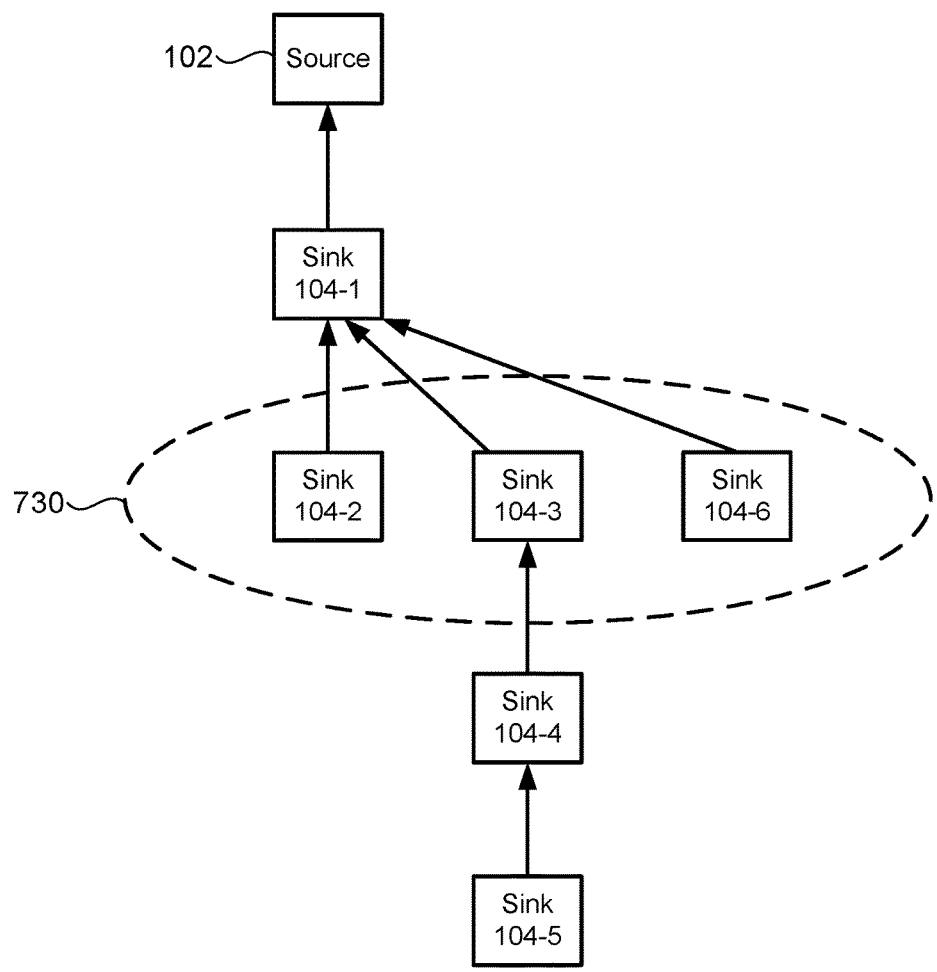
FIG. 7 illustrates a tree diagram corresponding to a fluid network exchange system, according to an embodiment of the present disclosure.

FIG. 7 illustrates a tree diagram 700 corresponding to fluid network exchange system 400, according to an embodiment of the present disclosure. In some embodiments, a tree diagram is created which is a representation indicating which paths connect to other paths. For example, as illustrated in FIG. 4D, path 420-1 connects to source 102, paths 420-2, 420-3, and 420-6 connect to path 420-1, path 420-4 connects to path 420-3, and path 420-5 connects to path 420-4. In tree diagram 700, this is diagramed by listing sinks 104 at different levels according to these connections. Any sinks with corresponding paths that connect to a same path are listed on a same level. Next, groups of sinks at a same level are identified and grouped. Sinks 104-2, 104-3, and 104-6 are therefore identified and grouped into tree group 730 because they each have corresponding paths that connects to a same path (path 420-1).

In some embodiments, sinks that are grouped together into tree groups may be flushed simultaneously to increase efficiency. Step 312 of method 300 may thus be modified such that any other sinks that are grouped with a sink that is about to be flushed are also caused to be flushed. This would modify the determined flushing order in reference to fluid network exchange system 400 to be sink 104-1 first, then sinks 104-2, 104-3, and 104-6 second (simultaneously), then sink 104-5 third, then sink 104-6 fourth. It should be noted that because a flow rate of a sink is often determined while all other sinks are turned off, flushing multiple sinks simultaneously may cause a certain flow rate to depart from its measured value due to the limited capacity of a source. An additional step that may be used when utilizing tree groups to improve efficiency is determining whether the flow rates of grouped sinks deviate from their previously determined values when simultaneously flushed. If the flow rates deviate, new flow rates may be determined or the tree groups may be ignored and step 312 of method 300 may proceed regularly as shown in FIG. 3B. If the flow rates do not deviate, then the tree groups can be utilized as described above.

Theoretical Development

The mathematical model of the network and the flushing procedure are described in the following discussion. Considered are a branching B=(V, E) with one source s, a set of C⊂V sinks, where c ∈ C is a sink, if $\delta^+(c)=\emptyset$, i.e. no edge leaves c. For each sink c ∈ C it is given $\phi_c \in \mathbb{R}_+$ representing the flow speed (or flow rate) at c. Moreover, there are capacities $u_e$ for each edge e∈ E.

For a v∈ V it is denoted with $P_{[s,v]}$ the (unique) path connecting s to v. For sake of simplicity it is written for an edge e and a path Pe ∈ P if e∈ E(P). For an edge e∈ E, f∈ E is called a predecessor of e, if there exists a path from f to e in B. f is called the direct predecessor of e, if f=(u, v) and e=(v, w) for some distinct u, v, w ∈ V. A vertex v is reachable from some edge (x,y), if there exists a x-v path in B. An edge e=(v,w) is reachable from (x,y) if v is reachable from x in B.

Thus, the model reflects the situation of one source and multiple sinks. Each sink is connected by a path to the source. In the network the sinks have two states: they are "open" or "closed". An open sink c allows the flow of the content with the flow speed ($\phi_c$, which is capacity per time unit. The flow speed can only be guaranteed if the pressure and/or the pump power is strong enough, since this is not always the case, it is postulated that at most one sink is open at the same time. This means that the state "open" of a sink c makes the media flow with constant speed $\phi_c$ from s towards c.

For example, assume B=$P_{[s,c]}$={{s, v, c}, {(s, v), (v, c)}} and is initially filled with red liquid (e.g., dirty fluid). s is connected to a blue liquid (e.g., clean fluid), and then c is opened for one time unit. This fills {(s, v)} with blue liquid, as the red fluid is pushed out through c. The {v, c} still contains red liquid. After another time unit of opening c, B contains blue liquid only.

For formalization reasons the notion of time sequences is introduced, defining which sink c is open in which order j for some period of time $t_{cj} \in \mathbb{R}$. The sequence $(t_{cj})$ reads as "open the c-th sink in the j-th sequence for $t_{cj}$ time units". Now a subsequence is defined:

Definition 1. Let T: $=(t_{cj})_{j=1}^k$, $t_{cj} \geq 0$ for each j=1, . . . , k and c ∈ C. One calls T': $=(t'_{cj})_{j=1}^l$ c ∈ C a subsequence of T if l≤k, $t'_{cj} \forall c \in C$, j=1, . . . , k and $t'_{cj} < t_{cj}$ for each j≥1. In other words, T' is a subsequence of T if until some ordinal l, if T' is exactly T between 0 . . . l and beyond l every sink in T' is open for a shorter period of time than a sink in T.

Definition 2. An edge e=(v, w) ∈ E is called flushed with a sequence T=$(t_{cj})_{j=1}^k$, c ∈ C, if there exists a subsequence T': $=(t'_{cj})_{j=1}^l$, c ∈ C such that:

I. $P_{[s,v]}$ is flushed with T'

$$\text{II. } u_e \leq \sum_{\substack{c \in C \\ c \text{ reachable from } e}} \sum_{j=1}^k \phi_c(t_{cj} - t'_{cj})$$

Definition 3. A sequence T is called complete for B=(V, E), if for any e ∈ E, e is flushed with T.

Definition 4. A complete sequence $(t_{cj})_{j=1}^k$ may be called economically-optimal if $$\sum_{e \in E} u_e = \sum_{c \in C} \sum_{j=1}^k \phi_c t_{cj}, \tag{1}$$

i.e. the amount of media leaving the network corresponds to exactly the amount of media in the network.

Lemma 1. Let e=(v, w) ∈ E. Let c ∈ C such that $\phi > 0$ and e ∈ $P_{[s,c]}$. Then there exists a flushing sequence for e.

Proof:

Let $P_{[s,c]} = e_1, \ldots, e = (v,w) = e_i, \ldots, e_m$. Let $$t_{cj} := \frac{1}{\phi_c} u_{e_j}$$

for $j = 1, \ldots, m$. One claims that $(t_{cj})_{j=1}^m$ may be a required sequence. Observe, that $$u_{e_j} = \phi_c t_{cj} \text{ for each } j = 1, \ldots, m. \tag{2}$$

Thus, for any other $k < m$, $\{e_1, \ldots e_k\}$ is flushed with $(t_{cj})_{j=1}^k$. In particular, $e_{i-1}$ is flushed with the subsequence and $(t_{cj})_{j=1}^{i-1}$ and $$u_e = \phi_c \cdot t_{ci} = \sum_{j=1}^i \phi_c(t_{cj}) - \sum_{j=1}^{i-1} \phi_c(t_{cj}) \le \sum_{\substack{c \in C \\ c \text{ reachable from } e}} \sum_{j=1}^m \phi_c(t_{cj} - t'_{cj}).$$

Using the above sequence, in m steps one opens the sink c, each step filling the pipes $e_1, e_2, \ldots, e_m$. By additivity, another flushing sequence would be $T = (t_{c1})$ with $$t_{c1} := \frac{\sum_{i=1}^m u_{e_i}}{\phi_c}.$$

Lemma 2. (Incremental flushing is enough) Let $F \subset E$ be the set of edges flushed by some sequence $T = (t_{cj})_{j=1}^k$, $c \in C$. Let $e \in E \setminus F$ with $e \in P_{[s,d]}$ and $\phi_d > 0$ for some $d \in C$. Let $$t_{d(k+1)} := \frac{1}{\phi_d} \sum_{f \in P_{[s,d]} \setminus F} u_f.$$

Then $F \cup \{e\}$ is flushed with the sequence $T, t_{d(k+1)}$.

Proof: As each $e \in F$ is flushed with the given sequence, this applies in particular for $e \in F \cap E$. If $F \cap E$ is empty, one gets:

$$t_{i(k+1)} := \frac{1}{\phi_i} \sum_{f \in P_{[s,c_i]} \setminus F} u_f = \sum_{f \in P_{[s,c_i]}} u_f.$$

And $(t_{i(k+1)})$ is by Lemma 1 a flushing sequence for E.

In the other case, let $e \in F \cap E$, and let $(u, v)$ be the first edge leaving $F \cap E$. Then for any path $P_{[s,c_i]}$:

$$\sum_{e \in P_{[s,c_i]}} u_e = \sum_{e \in P_{[s,u]}} u_e + \sum_{e \in P_{[u,c_i]}} u_e \tag{3}$$

$$\le \sum_{i} \sum_{j=1}^k \phi_i t_{ij} + \sum_{e \in P_{[u,c_i]}} u_e \tag{4}$$

$$= \sum_{i} \sum_{j=1}^k \phi_i t_{ij} + \phi_i t_{i(k+1)} \tag{5}$$

Thus, once a subset of edges has been flushed, it is enough to start flushing from the already flushed sub-network.

Lemma 3. Let e be an edge flushed by the sequence $T = (t_{ci})_{i=1}^m$, $c \in C$. Then there exists a $d \in C$ such that e is flushed by the sequence $(t'_{d1})$ and $t'_{d1} \le \sum_{i=1}^m t_{ci}$.

Proof: Let $d := \arg\max_{c \in C} \{\phi_c | c \text{ reachable from } e\}$. One gets $$u_e \le \sum_{c \in C} \sum_{i=1}^m \phi_c t_{ci} \le \phi_d \sum_{i=1}^m t_{ci}.$$

Let $$t'_{d1} := \frac{u_e}{\phi_d}.$$

Then $(t'_{d1})$ still flushes e and $t'_{d1} \le \sum_{i=1}^m t_{ci}$.

Corollary 1. Let $B = (V, E)$ be a branching and $v \in V$. Let $P = [s, v]$ be a path flushed by a sequence $T = (t_{ci})_{i=1}^m$. Then there exists a $d \in C$ such that e is flushed by the sequence $(t'_{d1})$.

Proof Let $e_1, \ldots, e_k$ be the edges on the path P. Using $d = \arg\max\{\phi_c | c \in C, c \text{ reachable from } e_k\}$ and observing that d is reachable by each predecessor of $e_k$, one can conclude by setting $$t_{1d} := \frac{\sum_{i=1}^k u_e}{\phi_d}.$$

Corollary 2. (opening each sink once is enough) Let $T = (t_{ci})_{i=1}^m$ be a complete flushing sequence for $B = (V, E)$. Then there exists a complete flushing sequence T' with $T' = (t'_{ci})_{i=1}^{|C|}$.

One proceeds by induction on $|C|$. If $C = \{c\}$ then one obtains the result by the Corollary 1, as $P_{[s,c]}$ can be the only path in B by existence of a flushing sequence. Induction step: Assume there is a flushing sequence $T^D = (t_{ci})_{i=1}^{|D|}$ for an induced subbranching $B_D$ of sinks $C = D \cup \{c\}$.

Let $v \in V(B_D)$ be the last vertex of the $P_{[s,c]}$ path. By lemma 2 and Corollary 1 one can extend $T^D$ to a flushing sequence T' where $T' = T^D, t_{c|D|}$ with $$t_{c|D|} := \frac{\sum_{e \in P_{[d,c]}} u_e}{\phi_c}.$$

As by induction hypothesis $T^D$ was a complete sequence for D.

Lemma 4. Let $B = (V, E)$ be a branching with $\phi_c > 0 \forall c \in C$. Then there exists a complete flushing sequence for B.

Theorem 1. There exists an $O(|V|)$ algorithm which computes a flushing sequence for E or decides that no flushing sequence exists.

Proof: One can proceed in a backward manner, with $\Phi$ to keep track of visited edges, Algorithm 1 Complete Flushing sequence

```
1: procedure FLUSHNETWORK(B, {ϕ_c,C ∈ C}, {u_e e ∈ E}))
2:     Φ ← ∅                          ▷ The queue of unprocessed edges
3:     T ← ∅                          ▷ the sequence, an ordered set
4:     i ← 0
5:     for c ∈ C do
6:         if ϕ_c = 0 then return ∅
7:         P := P_{[s,c]} \ Φ
8:         t_i ← Σ_{e∈P} u_e /ϕ_c
9:         i ← i + 1
10:        T ← T ∪ t_{ci}
11:        Φ ← Φ + P
       return T
```

Algorithm 1 decomposes the branching into a set of incremental paths. Note that $\Phi$ in this algorithm is the set of already flushed edges, as whenever a new P is computed, it starts either in s or in $\Phi$. If the algorithm returns $T \neq \emptyset$, $T=(t_{ci})$ is by Corollary 1 a flushing sequence, and by Lemma 2 it is incremental. The computation of P can be done in O (|P|) time, and as every edge can only appear once in a P, the overall runtime is O(|E(B)|) and thus by the branching property O (|V|).

Definition 5. A complete sequence $(t_{ij})_{j=1}^{k}$ may be time-optimal, if $$\sum_{i}\sum_{j=1}^{k} t_{ij} \leq \sum_{i}\sum_{j=1}^{l} t'_{ij},$$

for any other complete sequence $(t'_{cj})_{j=1}^{l}$.

Proposition 1. Let $c,d \in C$ with $0<\phi_c<\phi_d$. Let $P_c := P_{[s,c]} \setminus P_{[s,d]}$, $P_d := P_{[s,d]} \setminus P_{[s,c]}$ and $P_{cd} := P_{[s,c]} \cap P_{[s,d]}$. Let:

$$t_c := \frac{1}{\phi_c}\sum_{e \in P_{[s,c]}} u_e \quad (6)$$

$$t_d := \frac{1}{\phi_d}\sum_{e \in P_d} u_e$$

$$t'_c := \frac{1}{\phi_c}\sum_{e \in P_c} u_e \quad (7)$$

$$t'_d := \frac{1}{\phi_d}\sum_{e \in P_{[s,d]}} u_e$$

Then:

$(t_c,t_d)$ and $(t'_d,t'_c)$ are complete flushing sequences for $P_c \cup P_d \cup P_{cd}$ $$t_c+t_d<t'_c+t'_d$$

Proof:

$$\text{i. } t_c\phi_c + t_d\phi_d = \sum_{e\in P_{[s,c]}} u_e + \sum_{e\in P_d} u_e \quad (8)$$

$$= \sum_{e\in P_{[s,c]}\cup P_{[s,d]}} u_e \quad (9)$$

$$= \sum_{e\in P_c} u_e + \sum_{e\in P_{[s,d]}} u_e \quad (10)$$

$$= t'_c\phi_c + t'_d\phi_d \quad (11)$$

$$\text{ii. } t_c + t_d = \frac{1}{\phi_c}\sum_{e\in P_{[s,c]}} u_e + \frac{1}{\phi_d}\sum_{e\in P_d} u_e \quad (12)$$

$$= \frac{1}{\phi_c}\sum_{e\in P_c} u_e + \frac{1}{\phi_c}\sum_{e\in P_{cd}} u_e + \frac{1}{\phi_d}\sum_{e\in P_d} u_e \quad (13)$$

$$< \frac{1}{\phi_c}\sum_{e\in P_c} u_e + \frac{1}{\phi_d}\sum_{e\in P_{cd}} u_e + \frac{1}{\phi_d}\sum_{e\in P_d} u_e \quad (14)$$

$$= t'_c + t'_d \quad (15)$$

□

Thus, whenever an edge has the option to be flushed by more than one sink, the fastest one is selected in some embodiments.

Theorem 2. Let $(t_{ij})_{k=1}^{k}$ be a complete flushing sequence for $B=(V, E)$ with sinks $C \subset V$ and capacities $\{u_e|e \in E\}$. Let $\phi_c>0 \forall c \in C$. Then a time-optimal flushing sequence $T=(t_{ci})_{i=1}^{|C|}$ may exist such that $$\sum_{i=1}^{|C|} \phi_c t_{ci} = \sum_{e \in E} u_e,$$

Using this sequence no content is wasted.

Theorem 3. The flushing sequence in Theorem 2 can be found in O(|V|) time. Sorting may not be required using this sequence.

Proof: An initial step is a backward BFS. One can start at the leaves and use two functions: $\varphi: V \rightarrow \mathbb{R}$ and $\psi: V \rightarrow V$. Initially, one can set that for each leaf $\varphi(c) := \phi_c$ and $\psi(c)=c$. Let Q be a queue, and initially Q: =C. One computes in a backward breadth first search pass (Procedure BACKWARD-PASS of Algorithm 2) the linear computation of the quickest successor $\psi(v)$ for each vertex v.

In the second step one proceeds from the source to the sink pathwise (Procedure FORWARDPATH of Algorithm 2). As the previously computed $\psi$ and $\phi$ values are known, they are used to flush an edge via the quickest successor. Again, one does not want to use more capacity than necessary, so in total the same quantity is used for flushing as the capacity of the entire network. The linear running time follows, as each edge is opened often.

Algorithm 2 Complete Flushing sequence

```
1: procedure BACKWARDPASS (B, {ϕ_c c ∈ C}, {u_e e ∈ E}))
2:     Φ ← ∅                       ▷ The set1 of unprocessed edges
3:     Q ← C                       ▷ the queue
4:     for c ∈ C do
5:         φ(c) ← ϕc
6:         ψ(c) ← c
7:     while Q ≠ ∅ do
8:         w ← Q.First
9:         e = (v,ω), Φ ← Φ + e
10:        if δ⁺(d) ⊂ Φ then
11:            ψ(v) = argmin_{x∈δ⁺(w)}{φ(ω)}
12:            φ(v) = φ(ψ(v))
1: procedure FORWARDPASS (B, {ϕ,ψ,c ∈ C}, {u_e e ∈ E}))
2:     Q ← C                       ▷ the queue
3:     Q ← s
4:     ψ ← s
5:     T ← ∅
6:     while Q ≠ ∅ do
7:         μ ← 0
```

-continued

Algorithm 2 Complete Flushing sequence

```
 8:    c ← Q.First
 9:    P ← c
10:    while ψ(v) ≠ v do
11:        P + (v,ψ(v)) + v
12:        for w ∈ δ⁺(v) ∧ w ≠ ψ(v) do Q ← w
13:        Ψ ← ψ(v)
14:        μ ← μ + u_(v,ψ(v))
15:        t ← μ/φ(v)
16:        T ← T ∪ (t)
```

Figure 8:
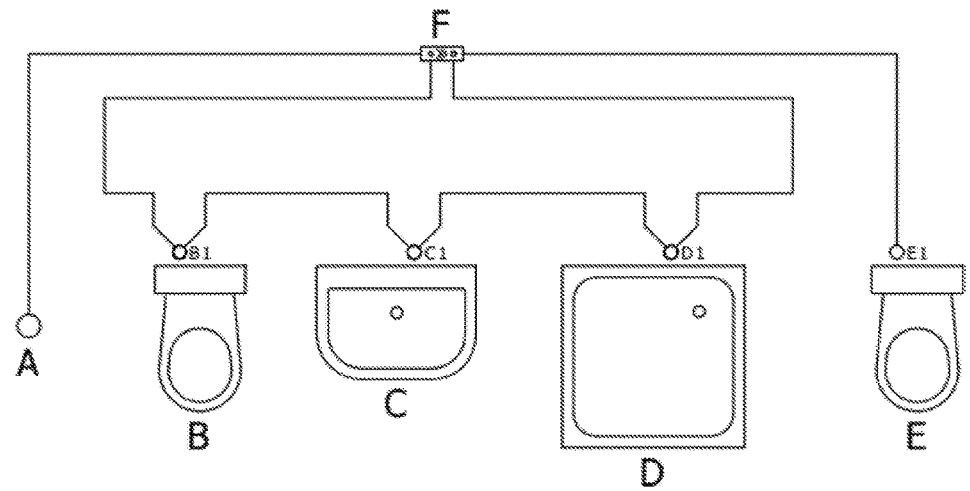
FIG. 8 illustrates a ring with a flow splitter, according to an embodiment of the present disclosure.
Figure 9:
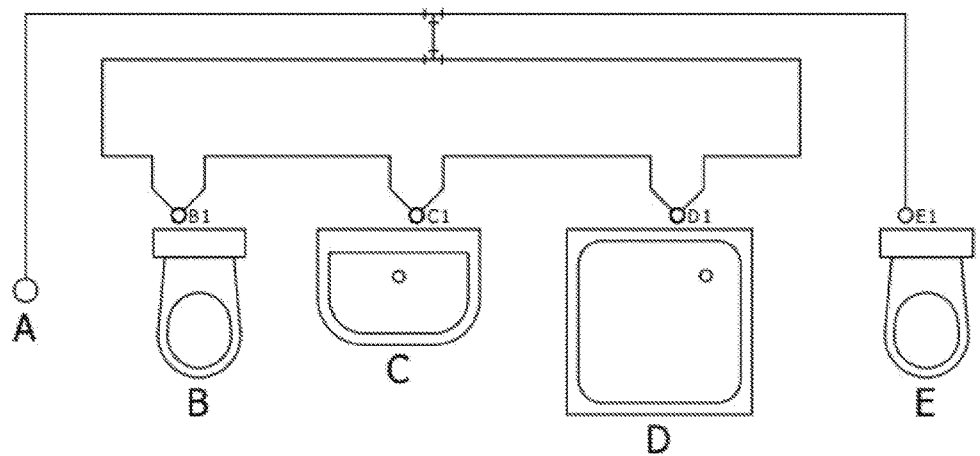
FIG. 9 illustrates a ring with a tee, according to an embodiment of the present disclosure.

Several freshwater standards allow the usage of so called rings. A ring is a cycle, attached to the remaining network either through a particular device (a flow splitter—e.g., FIG. 8), or via one tee (e.g., FIG. 9).

Figure 10:
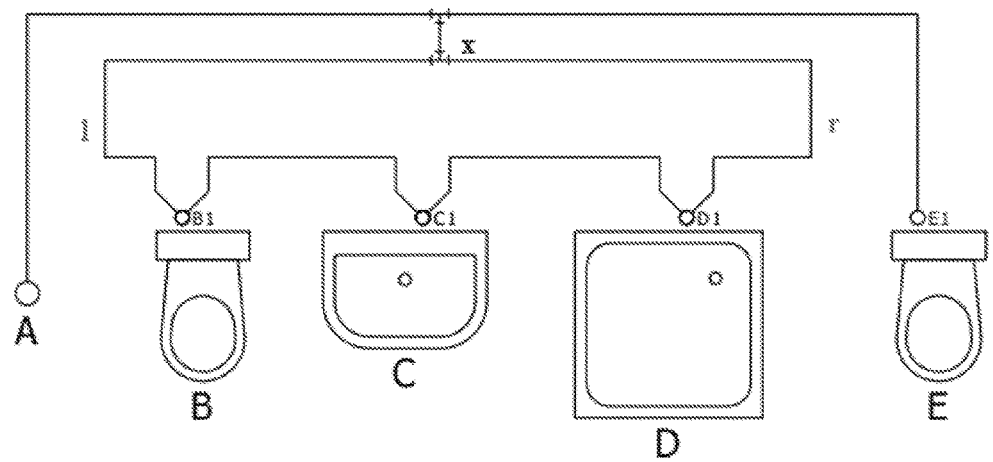
FIG. 10 illustrates a ring with a flow splitter, according to an embodiment of the present disclosure.

For example, consider FIG. 10, which shows a small instance with a ring. One picks a sink within the ring, e.g. C1. The sink decomposes the ring into two sub paths r and l, each starting at C1 and ending at x. C1 gets its supply from both branches, the right one r (via D1) and the left one l (via B1). Given a ring decomposition into two paths, the volume flows $\phi_r$, $\phi_l$ of each of the sub paths may be computed as:

$$\frac{\phi_l^2}{\phi_r^2} = \frac{dp_r}{dp_l} \qquad (16)$$

where $dp_r$, $dp_l$ are the pressure losses across the right and left path accordingly. In a ring one has:

$$dp_l \approx \rho \cdot \zeta \qquad (17)$$

$$dp_r \approx \lambda \cdot \zeta, \qquad (18)$$

where λ is the capacity of the left path l, and ρ the capacity of the right path r. The ζ value is the resistance which is proportional pipe porosity within the ring. This is generally a constant in the ring. This yields $$\phi_r \approx \frac{\sqrt{\frac{\rho}{\lambda}} \cdot (\phi_r + \phi_l)}{1 + \sqrt{\frac{\rho}{\lambda}}} \qquad (19)$$

Note that $\phi := (\phi_r + \phi_l)$ is the volume flow at the current sink.

As both, r and l are flushed with different volume flows, the slower one determines the approximate time required to flush both branches:

$$\tau(C1) := \max\left(\frac{\rho}{\phi_r}; \frac{\lambda}{\phi_l}\right). \qquad (20)$$

To make sure that the entire backward cone of C1 is flushed, one has to add the capacity of the path $P=P_{[A,x]}$, which can be flushed with the volume flow φ. In particular, this observation allows one to preprocess rings.

According to Equation (19), the expected flush time at a sink within the ring is determined by the volume flow and the hydraulical balance, which is the $$\frac{\rho}{\lambda}$$

ratio. The criterion for the best sink in a ring could be either a time-optimal one or one that minimizes wasted volume. In the first case one would choose the sink minimizing Equation (20), in the second case one would have to compute τ(c) for each sink. Note that the total volume flushed thorough a sink c with volume flow φ within a ring is:

$$\phi \cdot \tau(c) = \phi \cdot \max\left(\frac{\rho}{\phi_r}, \frac{\lambda}{\phi_l}\right) \qquad (21)$$

Thus, a particularly quick but unbalanced sink can flush the water in the fastest possible way, but will waste more water than a possibly slower but more balanced one. In this application, as the rings are small, one may choose the most hydraulically balanced sink among the fastest sinks in the ring as the best one.

Recall that a ring can be connected to the remaining network through a tee or a flow splitter. Flushing a flow splitter ring through a sink within the ring (internal flushing) may be done in the same manner as in the tee ring.

Figure 11:
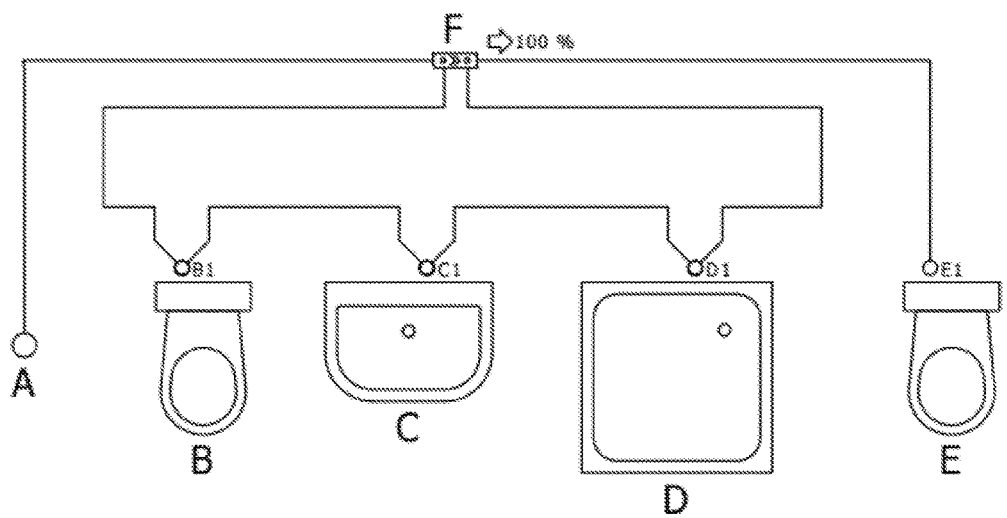
FIG. 11 illustrates a ring with a flow splitter, flushed through E, according to an embodiment of the present disclosure.

A flow splitter allows for external flushing. In the external case, the ring can be flushed through a sink that is outside the ring, as shown in FIG. 11. The flow splitter F connects the ring with three sinks B,C,D to the network. The flow splitter provides the option of flushing the ring through sink E which is identified by the flow splitter specific parameter γ.

When flushing through E, the path $P_{[A,E]}$ is flushed with volume flow $\phi_E$. But at F, the volume flow splits into $\gamma\phi_E$, which continues directly through F to E, and $(1-\gamma)\phi_E$ which enters the ring.

Figure 12:
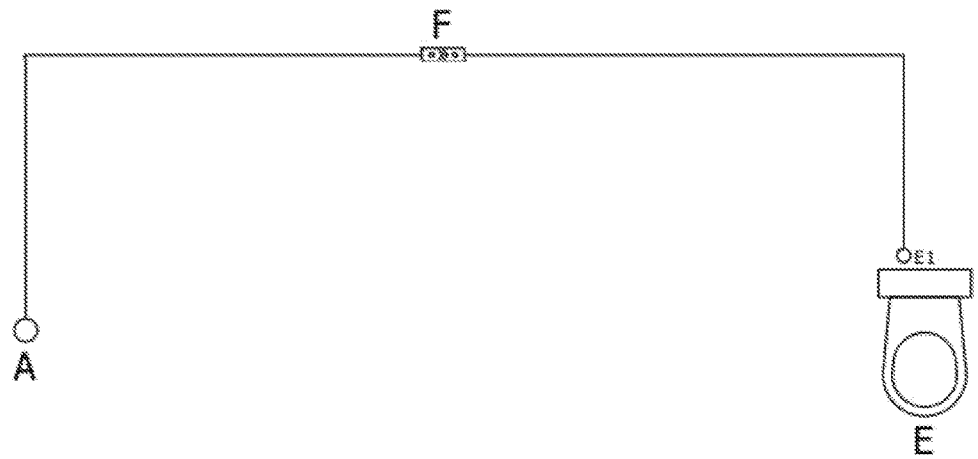
FIG. 12 illustrates a modified instance of a ring with a flow splitter, according to an embodiment of the present disclosure.

In total, this gives the opportunity to check which of the options is best to flush a flow splitter ring and again reduce a ring situation to a branching as in FIG. 12.

Lemma 5. Let c be a sink with volume flow φ which externally flushes a flow splitter ring with capacity υ. Let γ be a fraction as above. Let f be the flow splitter and s be the sink. Then T=(t) with $$t := \frac{\phi}{\sum_{e \in P_{[s,c]}} u_e} + \frac{\phi \cdot (1-\gamma)}{v}$$

is a complete flushing sequence for $P_{s,c}$ and the ring.
Proof: Let $$t_1 := \frac{\phi}{\sum_{e \in P_{[s,f]}} u_e}, \quad t_2 := \frac{\phi \cdot (1-\gamma)}{v}, \quad t_3 := \frac{\phi}{\sum_{e \in P_{[f,c]}} u_e} \cdot t_1$$

is a complete flushing sequence for the $P_{[s,f]}$ path, $t_2$ for the ring, and finally $t_3$ for the $P_{[f,c]}$ path. Thus, $T=(t_1, t_2, t_3)$ is a complete flushing sequence for the path $P_{s,c}$. By Lemmas 2 and 3, $t=t_1+t_2+t_3$.

Thus, a prior check allows one to pick the faster option. In most cases, economically an internal flushing may be preferred, unless there exists an extremely unbalanced sink within the ring. As discussed above, ring instances can be reduced to be handled by the branching-based algorithms. Again, the internal flushing and external flushing are distinguished.

External flushing, as specified in Lemma 5 can be handled by adding additional capacity to the flow splitter and temporarily removing the ring from the instance. Once the flushing times are computed, a postprocessing step assigns the flush values to the edges within the ring. (E.g., see FIGS. 11 and 12).

Figure 13:
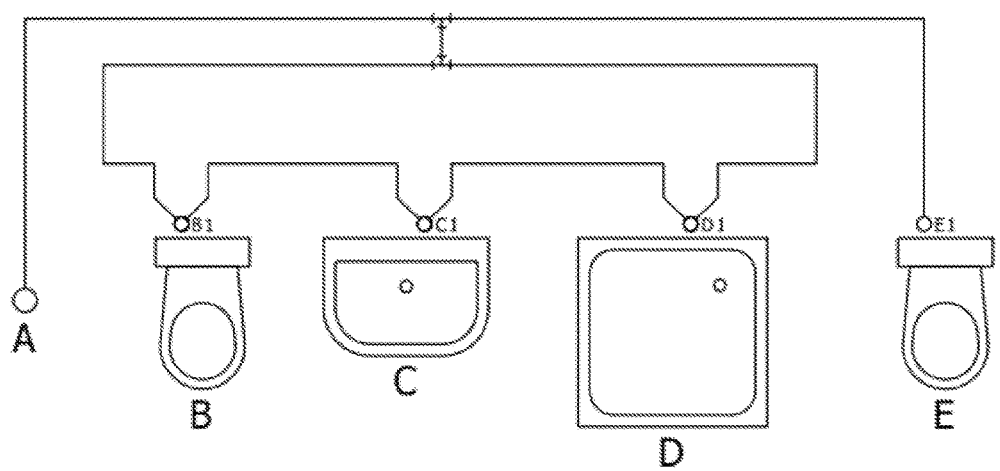
FIG. 13 illustrates a ring with a tee splitter, according to an embodiment of the present disclosure.
Figure 14:
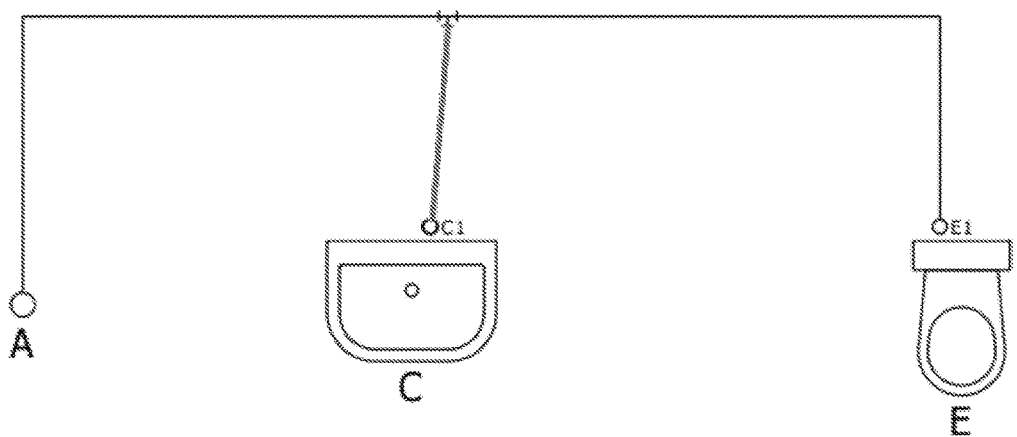
FIG. 14 illustrates a modified instance of ring with a tee in which the branch to C is the artificial edge with total capacity corresponding to the flushable ring capacity, according to an embodiment of the present disclosure.

For internal flushing, recall the backward and forward steps described previously. In the preprocess step, the best ring sink is computed, say C1. Then, one temporarily replaces the ring with an additional artificial edge (x, C1), where x is the ring entry vertex. The capacity $u_{(x,C1)}$ corresponds to the entire flushable ring capacity. (E.g., see FIGS. 13 and 14).

Thus, in the procedure BACKWARDPASS one knows the downward $\varphi$ and $\psi$ values and can handle them in the standardbranching. Whenever FORWARDPASS decides to proceed with the (v, x) edge for some direct predecessor v of x, one continues with the POSTPROCESSRING. The overall linear running time is unaffected, as the following lemma shows:

Lemma 6. Let R be a ring. Then POSTPROCESSRING can be implemented to run in $O(V(R))$ time.

Proof: While a single computation of $\phi_r$, $\phi_l$, $\tau(d)$ for ad $\in$ C can obviously be done in $O(V(R))$ time, the loop requires a slightly modified approach. It turns out that when moving from a sink c to c' the update from $\phi_r$, $\phi_l$, $\tau(c)$ to the new $\phi'_r$, $\pi'_l\pi(c')$ can be one in linear aggregated time for all c $\in$ C $\cap$ R. Assume c' is right hand of c.

Let again $\lambda$, $\tau$ be the left and right ring path capacities for c. Let $\xi$ be the capacity of edges on the ring between c to c'. Then $\lambda'$: $=\lambda+\xi$ and $\rho'$: $=\rho-\xi$ are then the left and right ring path capacities for c'. As the aggregated computation of all $\xi$ values takes $O(V(R))$ time, and the transformation to each $\phi_r$, $\phi_l$, $\tau$ $O(V(R))$ time. □

---

Algorithm 3 PostProcessInternalRing

---

1: procedure POSTPROCESSRING (R, {$\phi_c$ c $\in$ C}, {$u_e$ e $\in$ E}, w $\in$ ∨ (R), T))
2:     d ← BestSink(R)     ▷ the best sink in ring R
3:     Compute $\phi_r$, $\phi_l$, $\tau$(d)     ▷ as in Equation 20
4:     T ← T ∪ (t(d))
5:     for c $\in$ C ∩ R, c ≠ d do
6:        Compute $\phi_r$, $\phi_l$, $\tau$(c)     ▷ as in Equation 20
7:        T ← T ∪ (t(c))

---

Simplified Computer System

Figure 15:
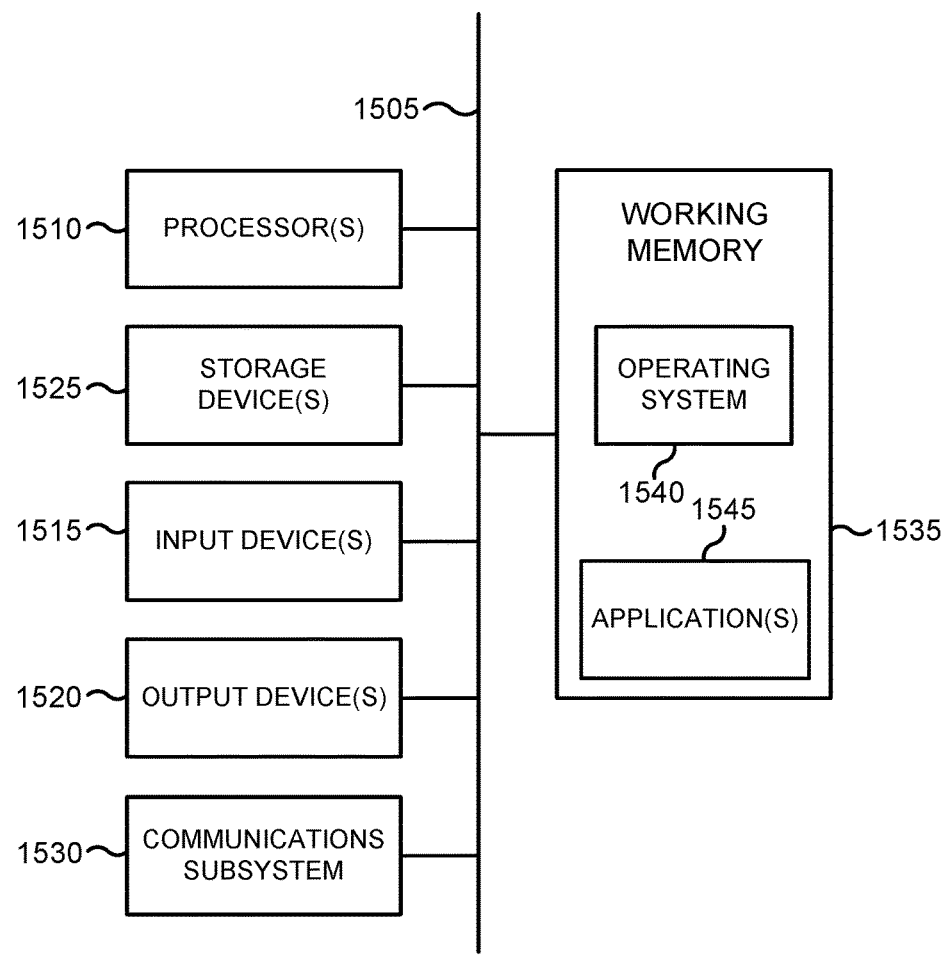
FIG. 15 illustrates a simplified computer system, according to an embodiment of the present disclosure.

FIG. 15 illustrates a simplified computer system 1500, according to an embodiment of the present disclosure. A computer system 1500 as illustrated in FIG. 15 may be incorporated into devices such as a portable electronic device, mobile phone, or other device as described herein. FIG. 15 provides a schematic illustration of one embodiment of a computer system 1500 that can perform some or all of the steps of the methods provided by various embodiments. It should be noted that FIG. 15 is meant only to provide a generalized illustration of various components, any or all of which may be utilized as appropriate. FIG. 15, therefore, broadly illustrates how individual system elements may be implemented in a relatively separated or more integrated manner.

The computer system 1500 is shown comprising hardware elements that can be electrically coupled via a bus 1505, or may otherwise be in communication, as appropriate. The hardware elements may include one or more processors 1510, including without limitation one or more general-purpose processors and/or one or more special-purpose processors such as digital signal processing chips, graphics acceleration processors, and/or the like; one or more input devices 1515, which can include, without limitation a mouse, a keyboard, a camera, and/or the like; and one or more output devices 1520, which can include, without limitation a display device, a printer, and/or the like.

The computer system 1500 may further include and/or be in communication with one or more non-transitory storage devices 1525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1500 might also include a communications subsystem 1530, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1530 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1530. In other embodiments, a portable electronic device, e.g. the first electronic device, may be incorporated into the computer system 1500, e.g., an electronic device as an input device 1515. In some embodiments, the computer system 1500 will further comprise a working memory 1535, which can include a RAM or ROM device, as described above.

The computer system 1500 also can include software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1525 described above. In some cases, the storage medium might be incorporated within a computer system, such as computer system 1500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as the computer system 1500 to perform methods in accordance with various embodiments of the technology. According to a set of embodiments, some or all of the procedures of such methods are performed by the computer system 1500 in response to processor 1510 executing one or more sequences of one or more instructions, which might be incorporated into the operating system 1540 and/or other code, such as an application program 1545, contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processor(s) 1510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1500, various computer-readable media might be involved in providing instructions/code to processor(s) 1510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1525. Volatile media include, without limitation, dynamic memory, such as the working memory 1535.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1500.

The communications subsystem 1530 and/or components thereof generally will receive signals, and the bus 1505 then might carry the signals and/or the data, instructions, etc. carried by the signals to the working memory 1535, from which the processor(s) 1510 retrieves and executes the instructions. The instructions received by the working memory 1535 may optionally be stored on a non-transitory storage device 1525 either before or after execution by the processor(s) 1510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A fluid network exchange system comprising:
a fluid network comprising a plurality of fluid paths, the fluid paths including a first path and a second path;
a source being an entry point of fluid to the fluid network;
a plurality of sinks being exit points of fluid from the fluid network, wherein the plurality of sinks include:
a first sink having a first flow rate; and
a second sink having a second flow rate, wherein the first flow rate is greater than or equal to the second flow rate, and the second flow rate is greater than or equal to the flow rate of each of the plurality of sinks other than the first sink;
a plurality of automatic flushing devices positioned at the plurality of sinks, wherein the plurality of automatic flushing devices include:
a first automatic flushing device positioned at the first sink; and
a second automatic flushing device positioned at the second sink;
one or more processors in communication with the plurality of automatic flushing devices and with one or more computer readable storage mediums, wherein the one or more computer readable storage mediums comprise instructions that cause the one or more processors to perform operations comprising:
determining a first flushing time for exchanging the fluid in the first path using the first automatic flushing device, the first path including a first portion of the fluid network extending between the first sink and the source;
determining a second flushing time for exchanging the fluid in the second path using the second automatic flushing device, the second path including a second portion of the fluid network extending between the second sink and the first path;
causing the first automatic flushing device to flush for the first flushing time; and
causing the second automatic flushing device to flush for the second flushing time.

2. The fluid network exchange system of claim 1, wherein:
the fluid network further includes a third path;
the plurality of sinks further includes a third sink having a third flow rate, wherein the third flow rate is greater than or equal to the flow rate of each of the plurality of sinks other than the first sink and the second sink;
the plurality of automatic flushing devices further includes a third automatic flushing device positioned at the third sink; and
the one or more processors are further caused to perform operations comprising:
determining a third flushing time for exchanging the fluid in the third path using the third automatic flushing device, the third path including a third portion of the fluid network between the third sink and at least one of the first path and the second path; and
causing the third automatic flushing device to flush for the third flushing time.

3. The fluid network exchange system of claim 2, wherein:
the fluid network further includes a fourth path;
the plurality of sinks further includes a fourth sink having a fourth flow rate, wherein the fourth flow rate is greater than or equal to the flow rate of each of the plurality of sinks other than the first sink, the second sink, and the third sink;
the plurality of automatic flushing devices further includes a fourth automatic flushing device positioned at the fourth sink; and
the one or more processors are further caused to perform operations comprising:
determining a fourth flushing time for exchanging the fluid in the fourth path using the fourth automatic flushing device, the fourth path including a fourth portion of the fluid network between the fourth sink and at least one of the first path, the second path, and the third path; and
causing the fourth automatic flushing device to flush for the fourth flushing time.

4. The fluid network exchange system of claim 3, wherein the plurality of automatic flushing devices are flushed sequentially, the second automatic flushing device after the first automatic flushing device, the third automatic flushing device after the second automatic flushing device, and the fourth automatic flushing device after the third automatic flushing device.

5. The fluid network exchange system of claim 4, wherein:
the second automatic flushing device is flushed immediately after the first automatic flushing device is flushed for the first flushing time;
the third automatic flushing device is flushed immediately after the second automatic flushing device is flushed for the second flushing time; and
the fourth automatic flushing device is flushed immediately after the third automatic flushing device is flushed for the third flushing time.

6. The fluid network exchange system of claim 1, wherein the plurality of automatic flushing devices are electromagnetic valves.

7. The fluid network exchange system of claim 1, wherein the flow rate for each of the plurality of sinks is a volume flow rate expressed in a unit of volume per a unit of time.

8. The fluid network exchange system of claim 1, wherein:
determining the first flushing time for exchanging the fluid in the first path includes:
determining a volume of the first path; and
determining the first flushing time based on the volume of the first path and the first flow rate; and
determining the second flushing time for exchanging the fluid in the second path includes:
determining a volume of the second path; and
determining the second flushing time based on the volume of the second path and the second flow rate.

9. A fluid network exchange system comprising:
a source being an entry point of fluid to a fluid network;
a plurality of sinks being exit points of fluid from the fluid network;
one or more processors in data communication with one or more computer readable storage mediums, wherein the one or more computer readable storage mediums comprise instructions that cause the one or more processors to perform operations comprising:
obtaining a flow rate associated with each of the plurality of sinks;
identifying a first sink of the plurality of sinks having a first flow rate;

identifying a second sink of the plurality of sinks having a second flow rate, wherein:
the first flow rate is greater than or equal to the second flow rate; and
the second flow rate is greater than or equal to the flow rate of each of the plurality of sinks other than the first sink;
determining a first flushing time for exchanging the fluid in a first path using the first sink, the first path including a first portion of the fluid network extending between the first sink and the source;
determining a second flushing time for exchanging the fluid in a second path using the second sink, the second path including a second portion of the fluid network extending between the second sink and the first path;
causing the first sink to flush for the first flushing time; and thereafter
causing the second sink to flush for the second flushing time.

10. The fluid network exchange system of claim 9, wherein:
the plurality of sinks further includes a third sink having a third flow rate, wherein the third flow rate is greater than or equal to the flow rate of each of the plurality of sinks other than the first sink and the second sink; and
the one or more processors are further caused to perform operations comprising:
determining a third flushing time for exchanging the fluid in a third path using the third sink, the third path including a third portion of the fluid network between the third sink and at least one of the first path and the second path; and
causing the third sink to flush for the third flushing time.

11. The fluid network exchange system of claim 10, wherein:
the plurality of sinks further includes a fourth sink having a fourth flow rate, wherein the fourth flow rate is greater than or equal to the flow rate of each of the plurality of sinks other than the first sink, the second sink, and the third sink; and
the one or more processors are further caused to perform operations comprising:
determining a fourth flushing time for exchanging the fluid in a fourth path using the fourth sink, the fourth path including a fourth portion of the fluid network between the fourth sink and at least one of the first path, the second path, and the third path; and
causing the fourth sink to flush for the fourth flushing time.

12. The fluid network exchange system of claim 11, wherein the plurality of sinks are flushed sequentially, the second sink after the first sink, the third sink after the second sink, and the fourth sink after the third sink.

13. The fluid network exchange system of claim 12, wherein:
the second sink is flushed immediately after the first sink is flushed for the first flushing time;
the third sink is flushed immediately after the second sink is flushed for the second flushing time; and
the fourth sink is flushed immediately after the third sink is flushed for the third flushing time.

14. The fluid network exchange system of claim 9, wherein the flow rate for each of the plurality of sinks is a volume flow rate expressed in a unit of volume per a unit of time.

15. The fluid network exchange system of claim 9, wherein:
determining the first flushing time for exchanging the fluid in the first path includes:
determining a volume of the first path; and
determining the first flushing time based on the volume of the first path and the first flow rate; and
determining the second flushing time for exchanging the fluid in the second path includes:
determining a volume of the second path; and
determining the second flushing time based on the volume of the second path and the second flow rate.

16. A method of replacing fluid in a fluid network, the method comprising:
identifying a source and a plurality of sinks in the fluid network, the source being an entry point of fluid to the fluid network and the plurality of sinks being exit points of the fluid from the fluid network;
obtaining a flow rate associated with each of the plurality of sinks;
identifying a first sink of the plurality of sinks having a first flow rate;
identifying a second sink of the plurality of sinks having a second flow rate, wherein:
the first flow rate is greater than or equal to the second flow rate; and
the second flow rate is greater than or equal to the flow rate of each of the plurality of sinks other than the first sink;
determining a first flushing time for exchanging the fluid in a first path using the first sink, the first path including a first portion of the fluid network extending between the first sink and the source;
determining a second flushing time for exchanging the fluid in a second path using the second sink, the second path including a second portion of the fluid network extending between the second sink and the first path;
causing the first sink to flush for the first flushing time; and thereafter
causing the second sink to flush for the second flushing time.

17. The method of claim 16, further comprising:
identifying a third sink of the plurality of sinks having a third flow rate, wherein the third flow rate is greater than or equal to the flow rate of each of the plurality of sinks other than the first sink and the second sink;
determining a third flushing time for exchanging the fluid in a third path using the third sink, the third path including a third portion of the fluid network between the third sink and at least one of the first path and the second path; and
causing the third sink to flush for the third flushing time.

18. The method of claim 17, further comprising:
identifying a fourth sink of the plurality of sinks having a fourth flow rate, wherein the fourth flow rate is greater than or equal to the flow rate of each of the plurality of sinks other than the first sink, the second sink, and the third sink;
determining a fourth flushing time for flushing a fourth path using the fourth sink, the fourth path including a fourth portion of the fluid network between the fourth sink and at least one of the first path, the second path, and the third path; and
causing the fourth sink to flush for the fourth flushing time.

19. The method of claim 16, wherein the flow rate for each of the plurality of sinks is a volume flow rate expressed in a unit of volume per a unit of time.

20. The method of claim 16, wherein:
   determining the first flushing time for exchanging the fluid in the first path includes:
      determining a volume of the first path; and
      determining the first flushing time based on the volume of the first path and the first flow rate; and
   determining the second flushing time for exchanging the fluid in the second path includes:
      determining a volume of the second path; and
      determining the second flushing time based on the volume of the second path and the second flow rate.

* * * * *